United States Patent
Kuznetsov

Patent Number: 5,628,252
Date of Patent: May 13, 1997

[54] METHOD AND APPARATUS FOR COMBINED LEVITATION AND GUIDANCE ALONG GUIDEWAY CURVATURE IN ELECTRODYNAMIC MAGNETICALLY LEVITATED HIGH SPEED VEHICLE

[75] Inventor: Stephen B. Kuznetsov, Pittsburgh, Pa.

[73] Assignee: Power Superconductor Applications Co., Pittsburgh, Pa.

[21] Appl. No.: 382,427

[22] Filed: Feb. 2, 1995

Related U.S. Application Data

[63] Continuation-in-part of Ser. No. 78,619, Jun. 17, 1993, abandoned.

[51] Int. Cl.$^6$ .................................................. B60L 13/00
[52] U.S. Cl. .......................................... 104/284; 104/281
[58] Field of Search .................................. 104/281, 284, 104/286, 293, 290, 294, 282

[56] References Cited

U.S. PATENT DOCUMENTS

| | | | |
|---|---|---|---|
| 3,913,493 | 10/1975 | Maki et al. | 104/281 |
| 4,055,123 | 10/1977 | Heidelberg | 104/282 |
| 4,299,173 | 11/1981 | Arima et al. | 104/284 |

*Primary Examiner*—Mark T. Le
*Attorney, Agent, or Firm*—Ansel M. Schwartz

[57] ABSTRACT

An apparatus for guiding and levitating a vehicle. The apparatus comprises a guideway mechanism upon which the vehicle travels. The apparatus is also comprised of a mechanism for actively controlling differential and lateral guidance or differential and vertical levitation strength of the vehicle with respect to the guideway mechanism. The controlling mechanism is electrodynamically reactive with the guideway mechanism. A method for guiding and levitating a vehicle. The method comprises the steps of guiding a vehicle along the guideway with electrodynamic guidance coils. Then, there is the step of actively controlling alternating current through the guidance coils to correspond with guideway curvature so the vehicle is maintained in a stable position relative to the guideway as it moves around a curve in the guideway and experiences roll compensation.

25 Claims, 16 Drawing Sheets

METHOD AND APPARATUS FOR COMBINED LEVITATION AND GUIDANCE ALONG GUIDEWAY CURVATURE IN ELECTRODYNAMIC MAGNETICALLY LEVITATED HIGH SPEED VEHICLE

This is a continuation-in-part application of U.S. patent application Ser. No. 08/078,619 filed Jun. 17, 1993, now abandoned.

FIELD OF THE INVENTION

The present invention is related to electrodynamically magnetically levitated high speed vehicles. More specifically, the present invention is related to electrodynamically magnetically levitated high speed vehicles whose lateral guidance is actively controlled.

BACKGROUND OF THE INVENTION

In electrodynamically magnetically levitated high speed vehicles, the centrifugal force developed along a curved track during travel needs to be counteracted for proper operation of the vehicle. Prior art U.S. Pat. Nos. 4,913,059, 4,779,538 and 4,299,173 disclose such vehicles and their operation. Typically, this centrifugal force is dealt with by the value of the time constant for a guide conductor being increased either by increasing the cross-sectional area of a related conductor loop or by providing an additional conductive loop with a desired thickness. In the earliest prior art inductive repulsion type magnetic levitation vehicle, all the levitation conductors and all the guide conductors have the same time constant, and the distance between the levitation superconductive magnet and the levitation conductor and between the guide superconductive magnet and the guide conductor are the same.

The present invention provides for lateral guidance combined with electrodynamic suspension for both tangent and curved guideway sections and includes an electromagnetic turn-out track switch in which the vehicle is levitated by an EM force between levitation conductors imbedded in a track of two or greater parallel rows and primary superconducting field magnets which are preferably vehicle mounted, and arrayed in the direction of vehicle motion. The vehicle guidance is from an array of guideway mounted secondary coils or conductors have the same inductance and resistance and spaced at periodic intervals in the direction of motion and separate sets of vehicle mounted SC field magnets. The EM force generated by a guidance magnet on one side of vehicle in a curvature, is enhanced above the guidance force generated by the other side of the vehicle along a curvature, with the differential force being controllable from the vehicle and adjustable in magnitude by design used to counteract the centrifugal force impinging on the vehicle in high speed turns, thus providing a lateral stabilization necessary for high speed controlled maneuvers.

SUMMARY OF THE INVENTION

The present invention pertains to an apparatus for guiding and levitating a vehicle. The apparatus comprises guideway means upon which the vehicle travels. The present invention is also comprised of means for actively controlling differential and lateral guidance or differential and vertical levitation strength of the vehicle with respect to the guideway means. The controlling means is electrodynamically reactive with the guideway means.

The present invention also pertains to a method for guiding and levitating a vehicle. The method comprises the steps of guiding a vehicle along the guideway with electrodynamic guidance coils. Then, there is the step of actively controlling alternating current through the guidance coils to correspond with guideway curvature so the vehicle is maintained in a stable position relative to the guideway as it moves around a curve in the guideway and experiences roll compensation.

The objective of the invention is to form a high-stiffness, highly stable guidance system for electrodynamically operated maglev vehicles wherein a large magnetic airgap between vehicle undercarriage and guideway surface components is an essential design feature and vehicle field magnets are high field superconductors without a mechanism to rapidly adjust excitation in response to guideway conditions. Active control is preferably made by electrical adjustment of guideway mounted hardware which has an electromagnetic time constant typically two or three orders of magnitude smaller than the vehicle field magnets. The described invention presents a superior method and apparatus for counteracting the centrifugal force developed when the vehicle encounters a curved or banked track at medium and high speeds.

BRIEF DESCRIPTION OF THE DRAWINGS

In the accompanying drawings, the preferred embodiment of the invention and preferred methods of practicing the invention are illustrated in which:

FIG. 17b is an electrical schematic for the elementary drawing shown in FIG. 17a.

DESCRIPTION OF THE PREFERRED EMBODIMENT

Figure 1:
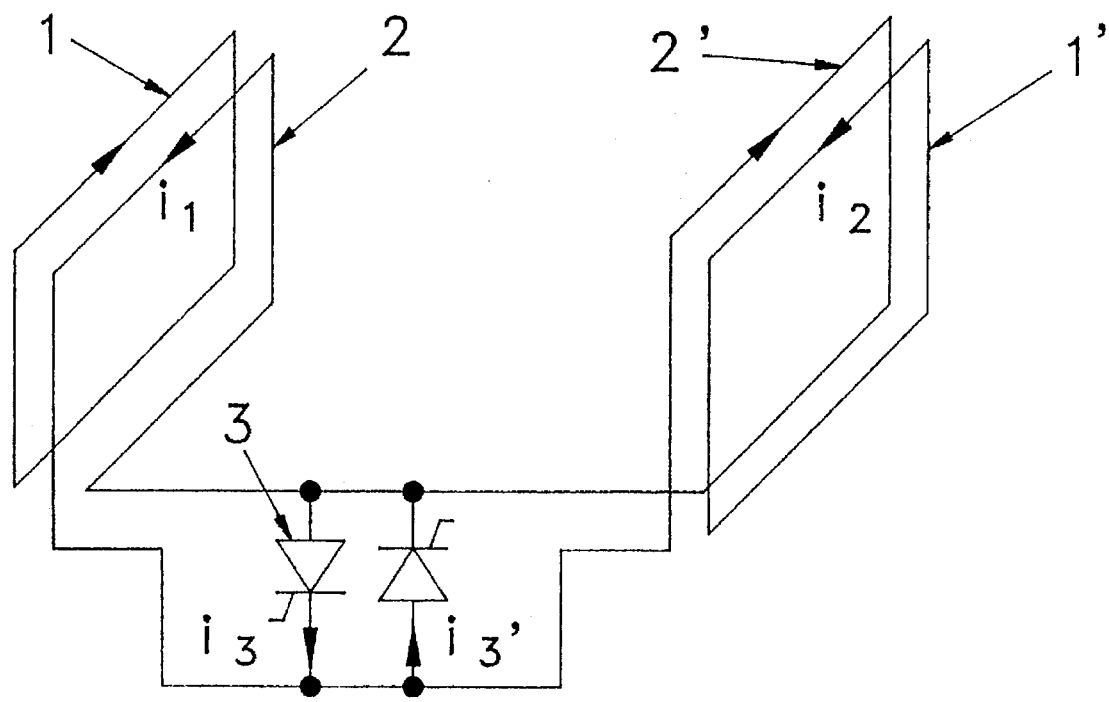
FIG. 1 is a schematic representation of an actively-control lateral guidance null-flux system with regulating thyristors shown for use with inverted-T for center position velocity-oriented guidance coils.

Referring now to the drawings wherein like reference numerals refer to similar or identical parts throughout the several views, and more specifically to FIG. 1 thereof, there is shown an apparatus for guiding and levitating a vehicle. The apparatus comprises guideway means upon which the vehicle travels. The apparatus is also comprised of means for actively controlling differential and lateral guidance or differential and vertical levitation strength of the vehicle with respect to the guideway means. The controlling means is electrodynamically reactive with the guideway means.

The present invention also pertains to a method for guiding and levitating a vehicle. The method comprises the steps of guiding a vehicle along the guideway with electrodynamic guidance coils. Then, there is the step of actively controlling alternating current through the guidance coils to correspond with guideway curvature so the vehicle is maintained in a stable position relative to the guideway as it moves around a curve in the guideway and experiences roll compensation.

More specifically, the present invention allows for actively controlling the differential in lateral guidance or differential in vertical levitation strength by inclusion of electronic high power switches in the null-flux loop to regulate the differential current. This scheme is shown in FIG. 1 for center positioned vertically oriented guidance coils or the "inverted-T" style of guideway with the vehicle mounted superconducting or high-field magnets 1 and 1' and interconnected null-flux loop 2 and 2' on the vertical guideway center member. The present invention incorporates the novel addition of a differential current regulator shown by way of example as thyristor pair 3 and 3' which are connected in anti-parallel and of identical voltage and current ratings, these two devices being externally triggered to modulate currents $i_3$ and $i_3'$ to account for differential vehicle loading, guideway curvature, wind loading on curves or non-optimum banking of guideway.

Figure 2:
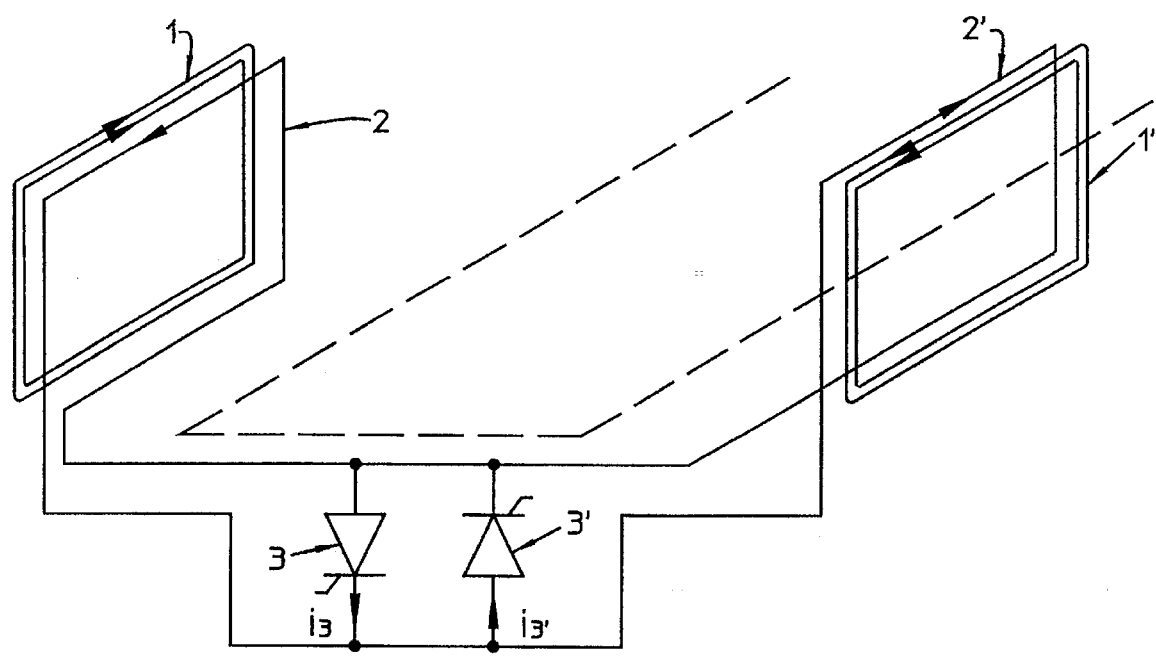
FIG. 2 shows a schematic representation of an alternate embodiment of an actively-control lateral guidance null-flux system where vehicle filled magnets are positioned in-board and the guideway guidance coils are spatially arranged outside of the vehicle magnet array, also in a vertical and longitudinal orientation.

FIG. 2 shows the alternate general scheme where vehicle field magnets are positioned in-board and the guideway guidance coils are spatially arranged outside of the vehicle magnet array, also in a vertical and longitudinal orientation. Current regulators 3 and 3' modulate the differential null-flux loop current $i_3$ and $i_3'$ in an active sense to provide a strong or light differential flux between the 2 sides to counteract the vehicle centrifugal force on high speed curves.

By way of example, the electronic switching elements are solid-state thyristors with ability to modulate current by virtue of phase angle chopping of voltage through an external command which signals when to trigger the thyristor into conduction and at what phase angle. By having two separate units arranged in anti-parallel with separate gating sources, it is possible and advantageous to trigger each thyristor to have different conduction periods e.g. 30° on device 3 and 90° on device 3' to produce a net DC current superimposed on the main AC null-flux current. The DC component produces a time offset in the buildup of peak guidance force. In the limiting case, when both electronic switches are on at full conduction angle (β-180°), then there is no differential transfer of energy or power between right and left sides, and the effect of self-neutralizing or self-centering action by null flux is not active. This situation is to be avoided. However, when the switches are fully off, then maximum null-flux centering action is present. Alternate types of electronic switches are power transistors, MOSFETs, IGBTs, ignitrons and MCTs.

Figure 3:
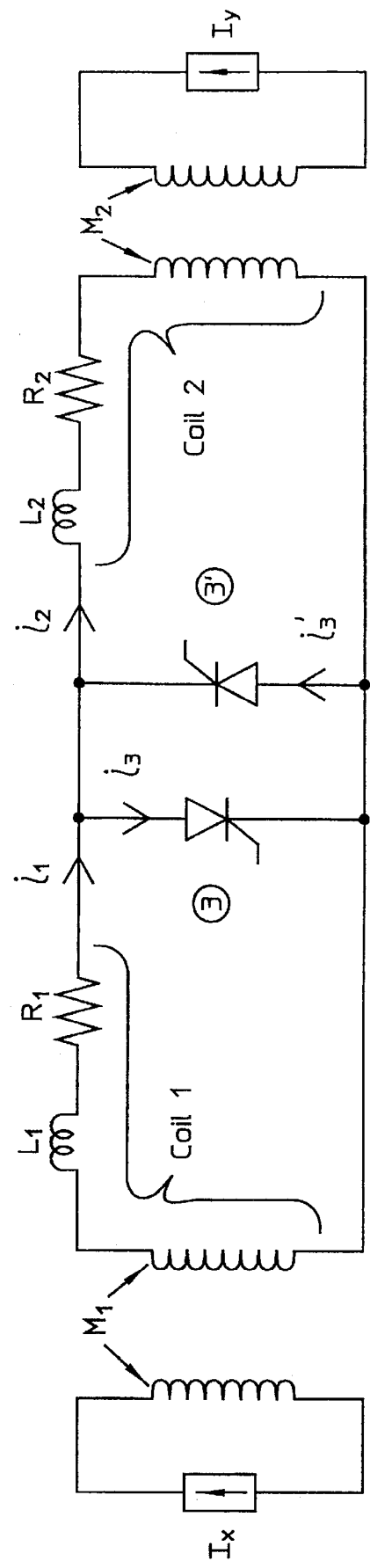
FIG. 3 shows an equivalent circuit of the present invention.

FIG. 3 shows and equivalent circuit of the present invention noting that the thyristor switching loop need not contain separate or discrete resistance (R) or inductance (L) as already sufficient L and R are contained in each guidance coil. Note that $M_1$ is the field to stator coil mutual inductance of left side, $M_2$ is field coil to stator coil mutual inductance of right side and $L_1$, $L_2$ are internal self inductances of guidance coils, $R_1$ & $R_2$ are internal resistances. According to the convention shown in the FIG. 3, we have $$i_1 + i_3' - i_3 = i_2$$

The three modes of operation are:

| | | | |
|---|---|---|---|
| a. | $i_3' = 0$ | Therefore $i_1 - i_3 = i_2$ | Positive lateral compensation |
| b. | $i_3 = 0$ | Therefore $i_1 + i_3' = i_2$ | Negative lateral compensation |
| c. | $i_3 = 0, i_3' = 0$ | Therefore $i_1 = i_2$ | Max. null-flux mode balanced condition. |

A further improvement to the present invention and a preferred embodiment is the design of the left and right side guidance coils with different magnetic reluctance specifically to account for guidance on curvatures and counteract vehicle centrifugal forces. The magnet reluctance is defined as $$R = \frac{l \mu_r \mu_o}{A}$$

Where l=Length of the magnetic path, typically a lateral path
A=Cross-section area of magnetic path
$\mu_r$=Relative magnetic permeability
$\mu_o$=Permeability of free space=$4\pi \times 10^{-7}$ H/m The present invention hereby pertains to a change in $\mu_r$ between left and right side guidance coils by the addition of ferromagnetic material with $\mu_r > 1$ on one side (Side 1) and the use of strictly non-ferromagnetic material $\mu_r = 1$ on the other side (Side 2). Side 1 has a combination or hybrid of air-core and iron-core paths, termed mixed-mu permeability (MMP) whereas Side 2 is strictly "air-core" path with singular-mu magnetic permeability.

Referring to FIG. 3 the value of inductance $L_1$ for Side 1 is consequently increased significantly (i.e. greater than 50%) above the inductance $L_2$ for Side 2. For example $L_1$ could be ≈500 μH, whereas $L_2 \approx 50$ μH in a full-scale maglev system. The values of $R_1$ and $R_2$ can be altered to allow either the same coil time constants on both sides or different time constants, where time constant is defined at $T_1 = L_1/R_1$ and $T_2 = L_2/R_2$. The Table 1 presents a summary of the two modes.

TABLE 1

|  | $L_1$ | $L_2$ | $R_1$ | $R_2$ | $T_1$ | $T_2$ |
| --- | --- | --- | --- | --- | --- | --- |
| Mode 1: | 500 μH | 50 μH | 1 mΩ | 1 mΩ | 500 ms | 50 ms |
| Mode 2: | 500 μH | 50 μH | 10 mΩ | 1 mΩ | 50 ms | 50 ms |

The preferred embodiment utilized Mode 2 as a standard and thus uniform time constant between both sides. This is accomplished physically by changing material resistivity e.g. Coil 1 will use high resistance aluminum such as Type 7075 and Coil 2 will use low resistance OFHC copper. Since the time constants are the same, the two coils will be physically similar in cross sectional area and volume. The mechanism of interest in controlling guidance force at high speed is the inductance of the total null-flux system because as speed increases, so does the induction frequency increase linearly with speed and thus above 40–50 m/s linear vehicle speed, these systems become "inductance limited" and the effects of resistance are negligible. The frequency of induced eddy currents in the guideway coils is calculated as $$F = \frac{V_s}{2T_p}$$

where $V_s$ is the vehicle speed in m/s and $T_p$ is the pole-pitch in m of the vehicle magnet field. For a $V_s$=150 m/s, and Tp=1 m, the frequency is thus f=75 Hz by way of example.

Figure 4:
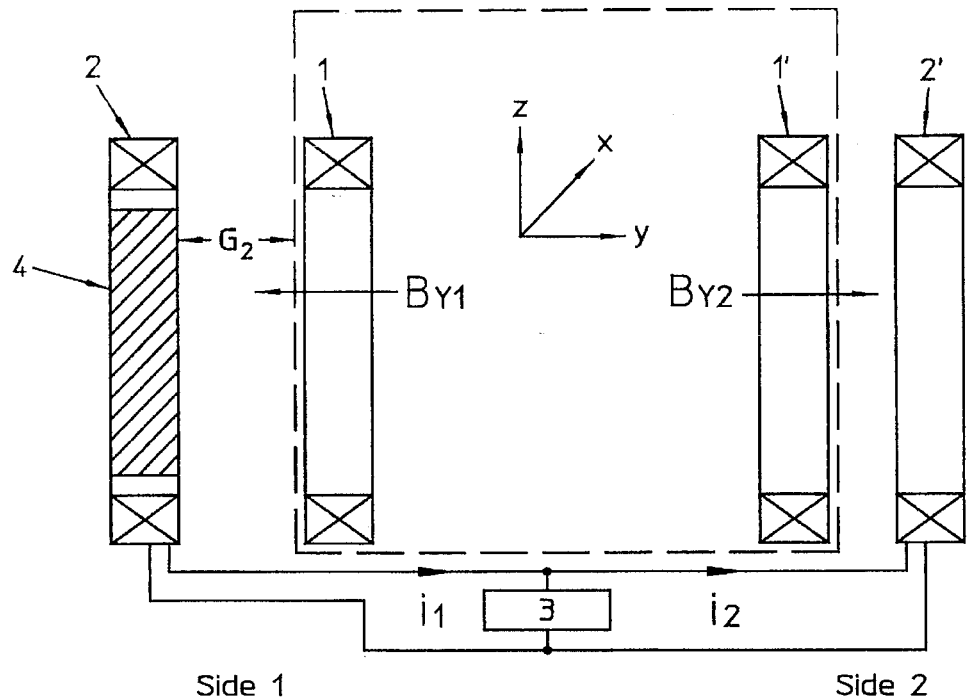
FIG. 4 shows a schematic representation of a mechanism by which to decrease the magnetic reluctance $R_t$ of side one.

FIG. 4 shows the mechanism by which to decrease the magnetic reluctance $R_1$ of Side 1 by using the mixed-mu pole piece Item 4 inserted in the core of the guidance coil Item 2. Side 2 guidance coil Item 2' is an air-core stationary coil with reluctance $R_2$. Vehicle magnets Items 1 and 1' are identical, closed-loop and preferably superconducting high field magnets both of air-core construction. A specific purpose of pole-piece Item 4 is to increase the magnitude of lateral flux density $By_1$ over opposing lateral flux density $By_2$ by virtue of the lower magnetic reluctance, $R_1$ or:
$R_1 < R_2$
$By_1 > By_2$ at the guideway surface In general, the magnetomotive force or MMF is related to the product of magnetic reluctance "R" and magnetic flux $\Phi$ for each side as:

MMF=RΦ

Figure 11:
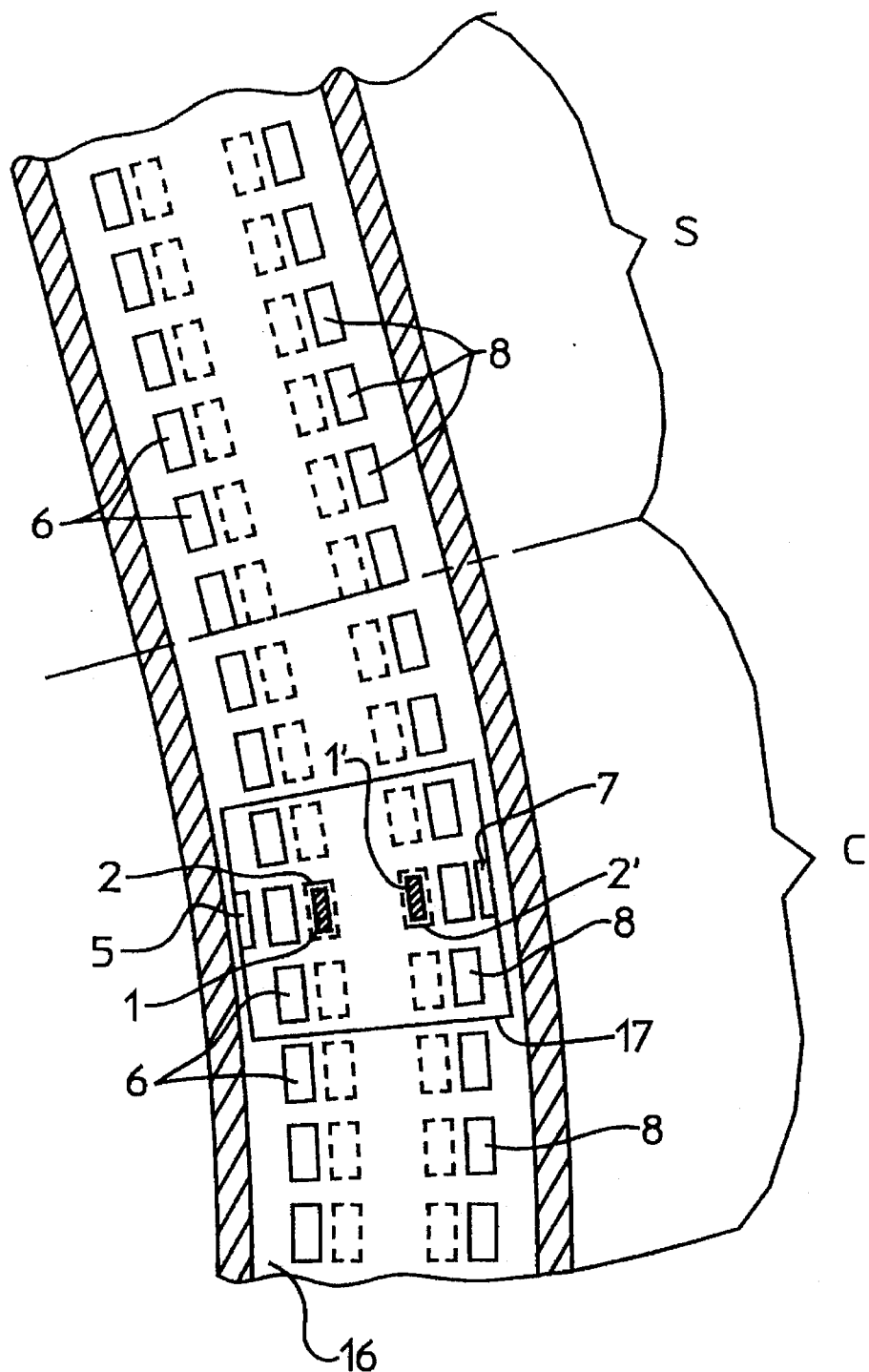
FIG. 11 is a partial plane view taken along lines XI—XI of FIG. 10.

With the superconductive magnets, the total MMF of both sides must be identical and consequently the total flux-reluctance product is the same for both sides. Side 1 with a low reluctance will have a higher flux and vice versa for Side 2. The total flux per side is composed of two components: work-producing flux and leakage flux. Leakage flux is higher in the single-mu system (Side 2) whereas the Side 1 pole piece Item 4 acts as a flux concentrator and lowers the leakage flux. It is important to note that FIG. 11 shows an open magnetic circuit for Side 1 in the respect the iron magnetic circuit does not form a closed path around its excitation source. This is a necessary condition of a mixed-mu system with high field superconductors and appropriate when it is necessary to limit the peak field induction of the ferromagnetic pole piece to under the saturation flux density, a value usually between 1.8 and 2.2 Tesla, according to the steel grade selected. The vehicle field SC magnets are usually designed between 3.5 and 5.5 Tesla and in combination with 15–30 cm type airgaps between vehicle and guideway, the field density attenuation in space is significant at a factor of usually 3:1 to 4:1 and the peak guideway induction is calculated less that 2.0 Tesla, making the use of conventional ferromagnetic pole pieces practical in the preferred embodiment.

Item 3 is the shunt-connected current regulator which allows a differential to exist in null flux currents $i_1$ and $i_2$ by electronic switching operation controlled by the programmed lateral vehicle response. There is no advantage to altering the vehicle SC magnet array to have either left or right differential reluctance because the common vehicle array must accommodate both right and left curvatures without modification or active control of the vehicle magnet system, which remains uniform in layout and MMF distribution. A typical field MMF for a 67 ton vehicle with 7 magnets per side in a dual array is in the range of 300–400 kAT/coil for a representative 23 cm vertical airgap. The total lift or guidance force is calculated on the basis of magnetic moment or the product of field MMF and magnet active surface area.

Figure 5:
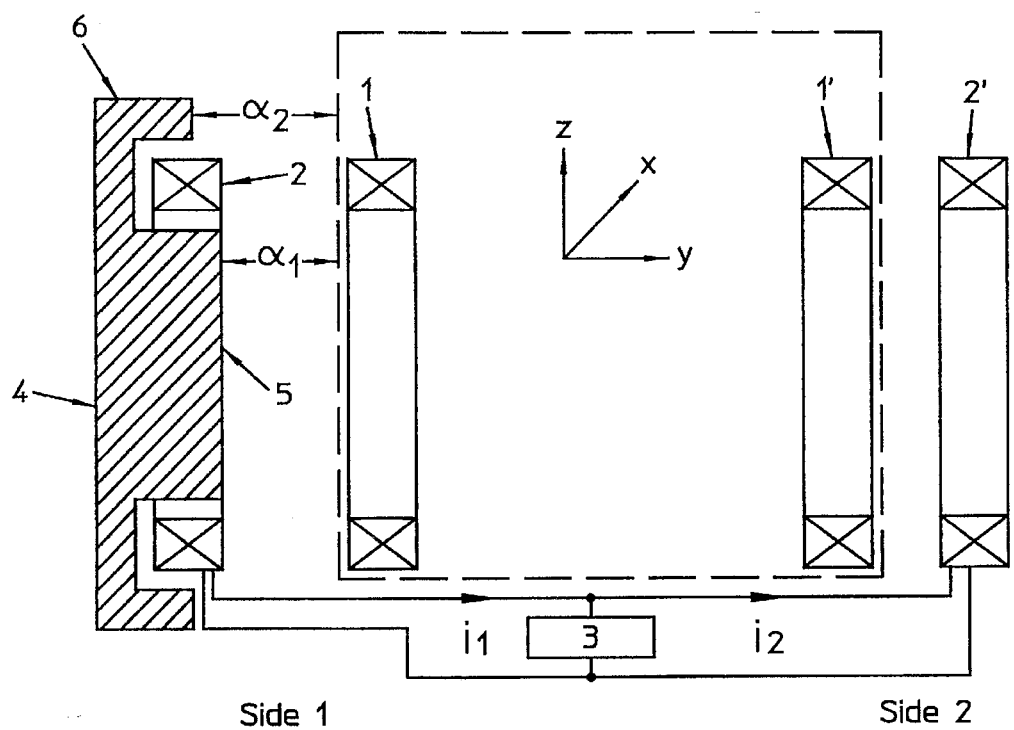
FIG. 5 shows a schematic representation of another embodiment of a mixed-Mu guidance track coil having lower magnetic reluctance with side one.

FIG. 5 shows a further embodiment of the mixed-mu guidance track coil with lower magnetic reluctance for Side 1 than FIG. 4 by including magnetic side piece Item 4. This also reduces stray magnetic field as well as reduce the electrodynamic stress on coil Item 2 conductors by causing lateral force to be transmitted directly to the ferromagnetic structures Items 5 and 6. Distance $\alpha_1$ is the lateral spacing between the outer plane of the vehicle field magnet and the main ferromagnetic surface 5, the principal interaction surface. Distance $\alpha_2$ is the spacing from the field magnet plane to the surface of the pole tips Item 6 on outer coil edges of Coil 2. Note that $\alpha_2 > \alpha_1$ is a necessary requirement for effectively controlling stray field and maximizing the lateral component of flux density, By or the vertical component, Bz. The optimum differential distance $\alpha_2 - \alpha_1$ is a strong function of the absolute airgap, $\alpha_1$ i.e. $\alpha_2 - \alpha_1 = k(\alpha_1)$ where k is a constant between 0.20 and 0.50 derived from electromagnetic field analysis.

Figure 6:
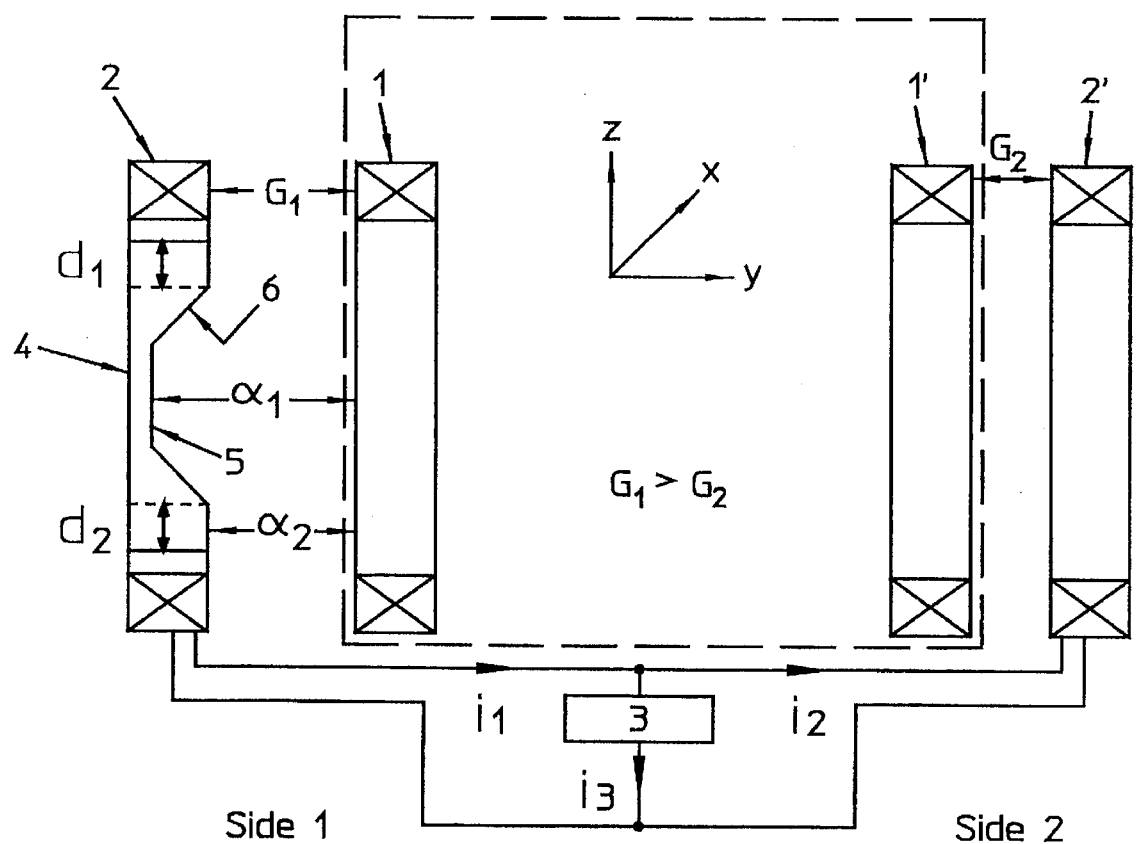
FIG. 6 is a schematic representation of an embodiment of a ferromagnetic flux concentrator on side one surrounding the guidance coil.

FIG. 6 shows a secondary embodiment of the ferromagnetic flux concentrator Item 4 on Side 1 surrounding guidance coil Item 2 but with increased magnetic reluctance in comparison with FIG. 11 baseline design. The inner core of the pole-piece Item 6 has a graded reluctance versus vertical distance which has a beneficial influence on the dynamic characteristics of the vehicle in both vertical and lateral perturbations at medium or high speed. Distance $\alpha_1$ is the furthest lateral separation from inner side wall of pole piece Item 4 to plane of vehicle field magnet Item 1 and $\alpha_2$ is lateral distance from vehicle field magnet plane to inward parallel surface of guidance pole piece Item 4 closest to vehicle. The distance $d_2$ is preferably larger than distance $d_1$ to enhance vertical oscillation damping. The differential $\alpha_1 - \alpha_2$ represents the amount of change in airgap magnetic path for the lateral component of magnetic flux entering the pole-pieces normal to its surface. The general effect of the graded pole piece Item 4 is to cause the flux to concentrate at the surface Item 7 or surrounding the guidance coil Item 2 to increase the magnetic flux in the $d_2$ area and focus the field more intensely than in a 100% air-core system. The dimension $\alpha_2$ must be sized to insure that the maximum flux density does not exceed the saturation flux density of the ferromagnetic material, which has a limit of about 2.2 Tesla typical value. The FIG. 6 system also incorporates a shunt loop electronic-switch Item 3 which regulates the null-flux currents $i_1$ and $i_2$ to insure differential adjustment of Coil i/Coil 2 MMF in high speed curves. Item 3 may be comprised of semiconductor or gaseous conduction high power switches with response times in the range of 1 μs to 80 μs for use in 150 m/s linear speed systems. In FIG. 6, gap 1 corresponding to Side 1 is shown larger than gap 2 corresponding to Side 2 representing a vehicle on a high-speed curve where curvature of the guideway is to the left. Clearly, for curvature in the opposite direction, the gap 2 becomes larger than gap 1 to counteract centrifugal force developed by the vehicle.

Figure 7:
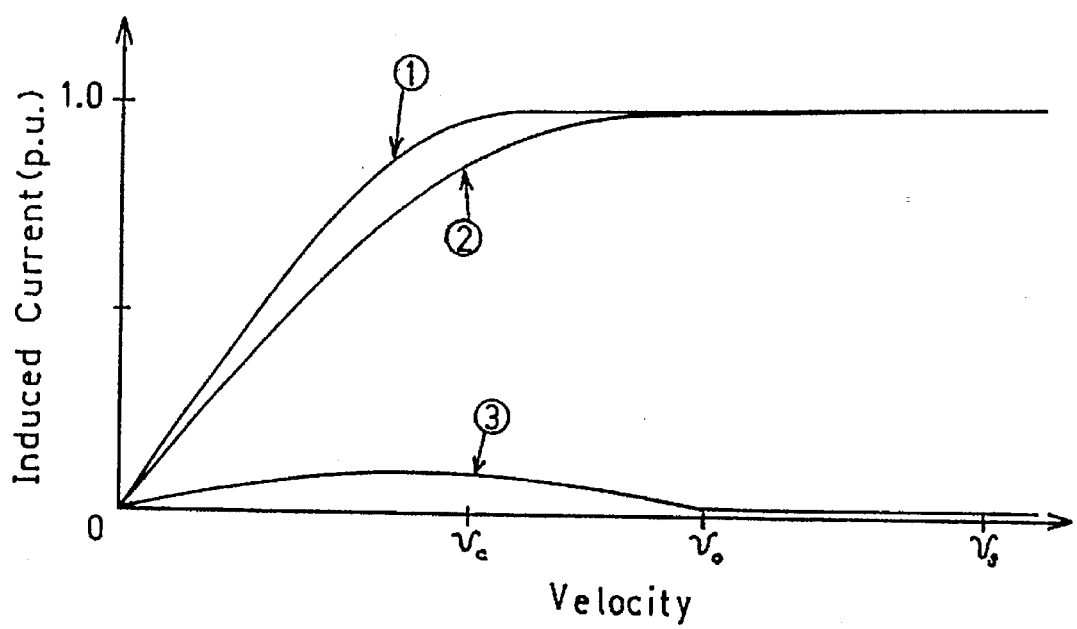
FIG. 7 is a graph of current in the null-flux loop versus vehicle speed for the case of increased side one inductance.
Figure 8:
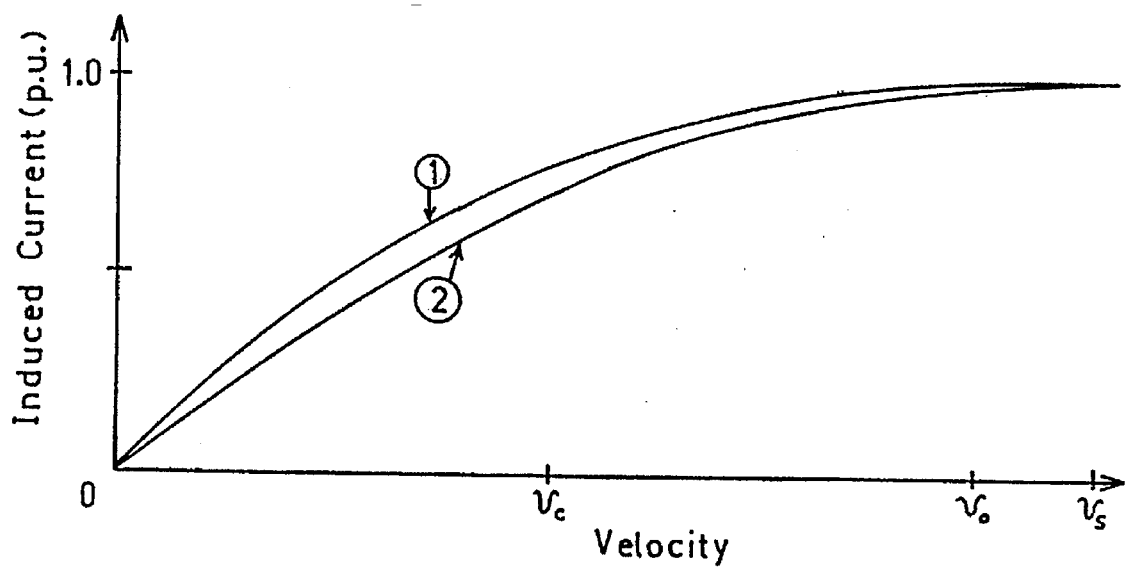
FIG. 8 is a plot of current versus speed for the case of reduced side one inductance.

FIG. 7 shows a plot of current in the null-flux loop versus vehicle speed noting that at speed $V_0$ and above the current is substantially constant due to "inductance limited" nature of the Coils 1 and 2 at medium and high frequencies. In typical maglev systems, the $V_0$ point occurs prior to the 50% speed point i.e. $V_0 < 0.5\ V_s$ where $V_s$ is the final synchronous linear speed at the nominal rating point. Curve 1 pertains to the case where $i_3 = 0$, that is prior-art and no shunt regulation or active control. Curve 2 corresponds to the case where $i_3 > 0$ and specifically the magnitude of $i_1 < i_2$ i.e. the higher inductance coil results in less null-flux current than the air-core coil, and $i_1 = i_2 - i_3$. Since Coil 1 has the higher inductance, its system becomes inductance limited at a lower vehicle speed $V_2$ and has the response show by Curve 2. The Coil 1 current loop has the Curve 1 response. Curve 3 describes the regulator current which peaks at or below speed point $V_2$. The preferred embodiment has the design speed $V_2$ variable by coil and pole piece design including the ability to shift $V_2$ beyond $V_0$ as shown in FIG. 8. The technology is intended to be used at speeds in excess of 150 m/s, which is a convenience sample speed for calculation.

Figure 9:
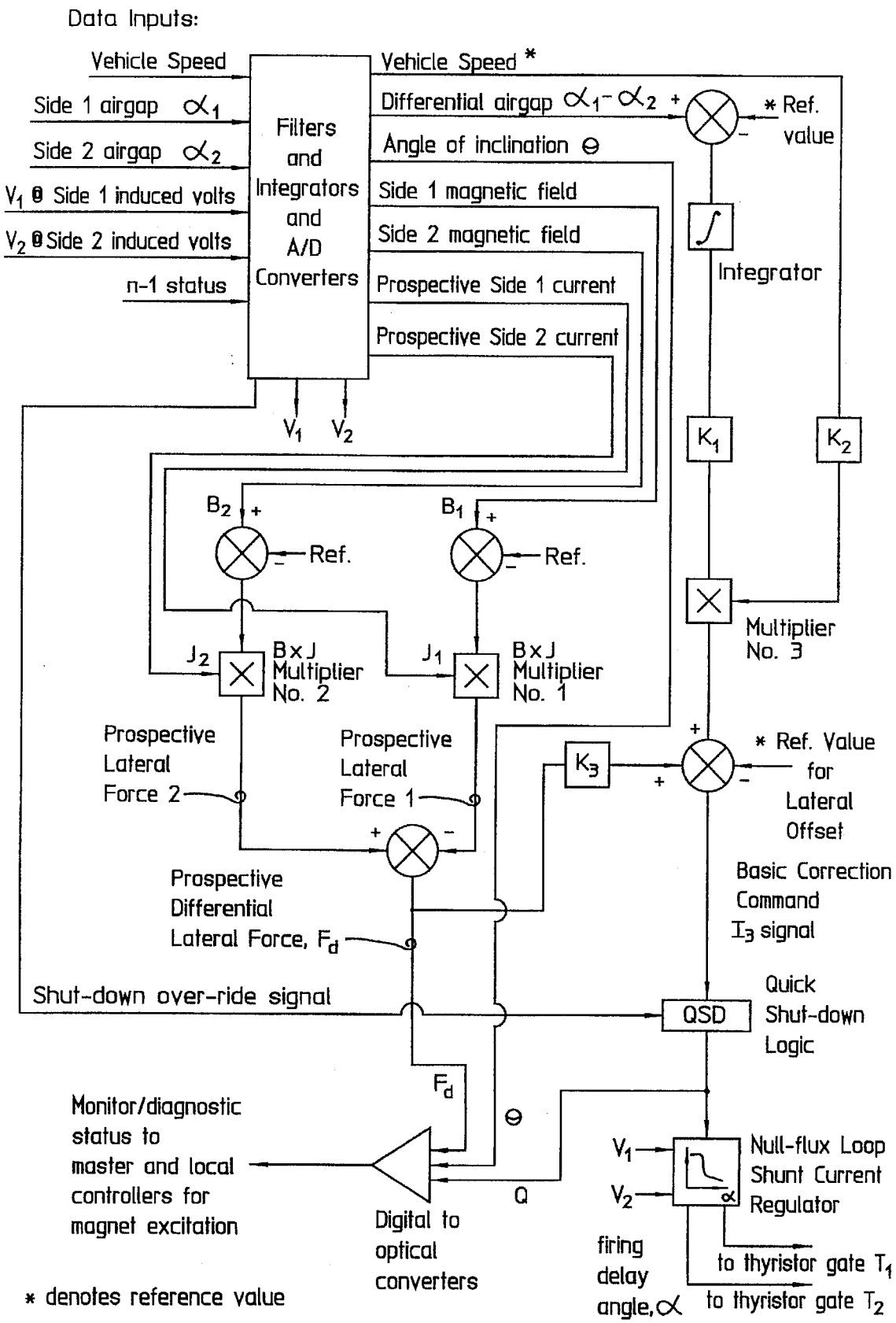
FIG. 9 is a schematic representation of an automatic electronic measurement and control system for, the guideway.

FIG. 9 shows an automatic electronic measurement and control system for the guideway—located current regulator connected to Item 3 as shown in FIGS. 4, 5 or 6. The lateral airgap on both sides of the vehicle is detected by guideway mounted sensors spaced at periodic intervals and these airgap signals and its differential are entered as data to the master control scheme. By way of example, the control scheme may be a Type II proportional and integral servo control with zero feedback error. The controller has the following data input ports:

Side 1 lateral airgap

Side 2 lateral airgap

Side 1 vehicle induced voltage

Side 2 vehicle induced voltage

Vehicle velocity

Monitor signal from adjacent null-flux loop regulator

The servo controller then computes the following intermediate parameters:

Side 1—Side 2 differential lateral airgap

Side 1 guidance magnet magnetic field

Side 2 guidance magnet magnetic field

Angle of inclination

Prospective Side 1 null-flux current

Prospective Side 2 null-flux current

The controller outputs three quantities

Forward thyristor or switching device gate turn-on/turn-off pulse.

Reverse thyristor or switching device gate turn-on/turn-off pulse.

Monitor signal to central system controller and subsequent (adjacent) local controller for diagnostics function.

Table 2 provides an example of the design parameters for a vehicle of the present invention; although a multitude of alternative design parameters are available depending on the constraints of the system.

TABLE 2

Specification of Electrical/Mechanical Design Parameters for Full-scale High-speed Maglev Guideway and Vehicle

| Operational Characteristics of a Representative Maglev Vehicle | |
|---|---|
| Capacity Range | 200 passengers |
| Overall Length | 39 m |
| Width (nominal) | 3.65 m |
| Height (nominal) | 3.2 m |
| Aerodynamic Drag Coefficient | 0.26 |
| Nominal Laden Weight (200 passengers) | 67 tons |
| Acceleration | 1.0 m/sec$^2$ (0.1 g) |
| Deceleration - Normal | 2.5 m/sec$^2$ (0.25 g) |
| Deceleration - Emergency | 10 m/sec$^2$ (1.0 g) |
| Propulsion | Linear Synchronous Motor |
| Upper Speed | 500 km/hr. |
| Propulsion Magnet Refrigeration Load | 41–50 kW |
| Characteristics at Cruising Speed of 500 km/hr. | |
| Maximum Continuous Thrust | 60 kN |
| Ground Clearance | 0.10–0.12 m |
| Magnetic Drag | 12–15 kN |
| Aerodynamic Drag | 35–37 kN |
| Side Wind Loading (100 km/hr. cross wind) | 70 kN |
| Noise, at 15 m Sideline | 89 d BA |
| Guideway Aluminum for Levitation Strips | 42 metric tons/km |
| Superelevation limit | 15° |
| Maximum Roll Ram-rate | 12° per second |
| Minimum Radius at Maximum Speed | 1.6 km |
| Suspension Stiffness - Nominal-Vertical | 3 × 10$^6$ N/m |
| Levitation System - Natural Frequency | 2 Hz |
| Levitation Lift Off Speed Range | 48–60 km/hr. |
| Substation Electrical Output | 12.9 MVA at 122 Hz |
| Guidance System - Typical Values | |
| Vehicle SC Magnet Strength | 385 kAT |
| Magnet Width | 0.40 m |
| Magnet Length | 1.50 m |
| Vertical Airgap | 23 cm |
| Guidance Natural Frequency | 0.85–1.0 Hz |
| Guidance Stiffness - Nominal-Lateral | 4.2 × 10$^6$ N/m |
| Total Superconducting Magnets | 7 per side vehicle |
| Magnetic Moment (MMF × Surface Area) | 1617 kAT - sq. m./side |

Figure 10:
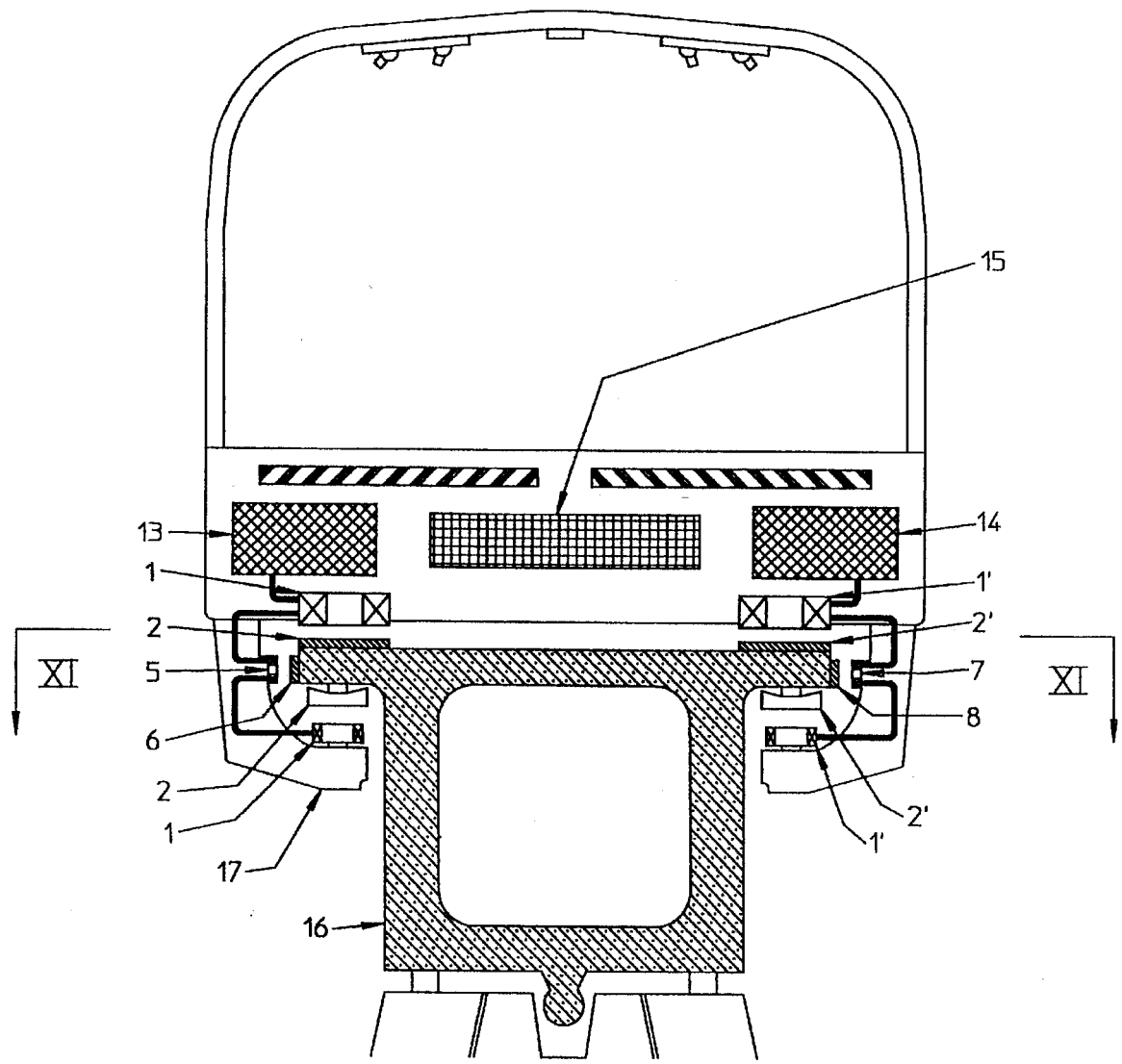
FIG. 10 is a schematic representation of a cross section, of a vehicle in a guideway of the present invention.

In regard to FIG. 10, this is an electrodynamically suspended vehicle with dual propulsion motors, dual guidance and dual suspension systems along a non-conducting, non-ferromagnetic guideway structure Item 16. Item 1 (item 3) is a high frequency inductive power pickup mounted on the vehicle left (right) outrigger item 17. Item 2 (item 4) is the corresponding high frequency stator section mounted underneath guideway which transfers electrical power to the vehicle by induction action. Items 5, 7 are the left and right side electrodynamic lateral guidance coils mounted on the vehicle outrigger and driving magnetic flux in principally a lateral direction with respect to vehicle motion and interacting with the guideway mounted longitudinally-meaning conductive strips items 6, 8 respectively. These coils 5, 7 may or may not be superconducting coils depending on the magnitude of the lateral guidance force desired. Items 9, 11 are the left and right side combination suspension magnets and linear propulsion motors mounted on vehicle undercarriage; they are powered by corresponding variable frequency power supplies 13, 14. Items 9, 11 interact with guideway-mounted horizontal levitation/propulsion strips items 10, 12 which are composed of a sandwich arrangement of ferromagnetic strip material closest to the guideway surface and conductive, non-ferromagnetic strip material closest to the vehicle undercarriage. Items 10, 12 may be composed of continuous material in the longitudinal direction (i.e. direction of vehicle motion) or may be composed of discrete loops or a ladder configuration depending on overall performance requirements. In the preferred embodiment, items 10, 12 are composed of aluminum strip on the upper surface and steel plate for the lower material; depending on the relative thicknesses of these two materials the vertical force developed between items 9 and 10 and between items 11 and 12 can be either attractive or repulsive. For example, when the amount of aluminum exceeds the amount of steel material then the overall vertical force on item 9 or 11 will be repulsive. Items 18, 19 are the left and right side coolant supplies for items 9, 11 respectively which in the preferred embodiment items 18, 19 are refrigerator/liquifiers for liquid nitrogen or liquid helium cryogens. Items 18, 19 also feeds either cold gas or liquid cryogen to items 5, 7 if the system uses cryogenic lateral guidance coils. Item 15 is the centrally located power supply consisting of either a fuel cell or an electrical frequency changer such as cycloconverter which takes as input the power brought on-board by items 1, 5 at high frequency and reduces this to either low frequency AC (e.g. 0–200 Hz) or direct current to feed into items 13, 14. The passenger compartment floor preferably contains a sandwich combination of ferromagnetic and conductive shielding in the form of horizontal plates spanning the entire vehicle width and length to attenuate the magnetic fields generated by the propulsion and suspension coils.

As shown in FIG. 11, the secondary coils or conductors 6 and 8 have the same inductance and resistance and are spaced apart at periodic, reoccurring intervals in the direction of motion to interact with the separate set of vehicle mounted SC field magnets. The vehicle lateral guidance means is composed of an array of guideway mounted secondary coils 6 and 8 or conductors having the same inductance and resistance and spaced at periodic intervals in the direction of motion and separate sets of vehicle mounted SC field magnets 5 and 7. The EM force generated by a guidance magnet on one side of the vehicle in a horizontal orientated curvature, is enhanced above the guidance electrodynamic force generated by the other side of the vehicle along a guideway curvature C shown in FIG. 11, with the differential force being controllable from the vehicle and adjustable in magnitude in accordance with radial acceleration limits for passenger comfort used to counteract the centrifugal force impinging on the vehicle in high speed turns, thus providing a lateral stabilization necessary for high speed controlled maneuvers. Also shown in FIG. 11 is a straight guideway section S adjoining the section of guideway identified as guideway curvature C.

Figure 12:
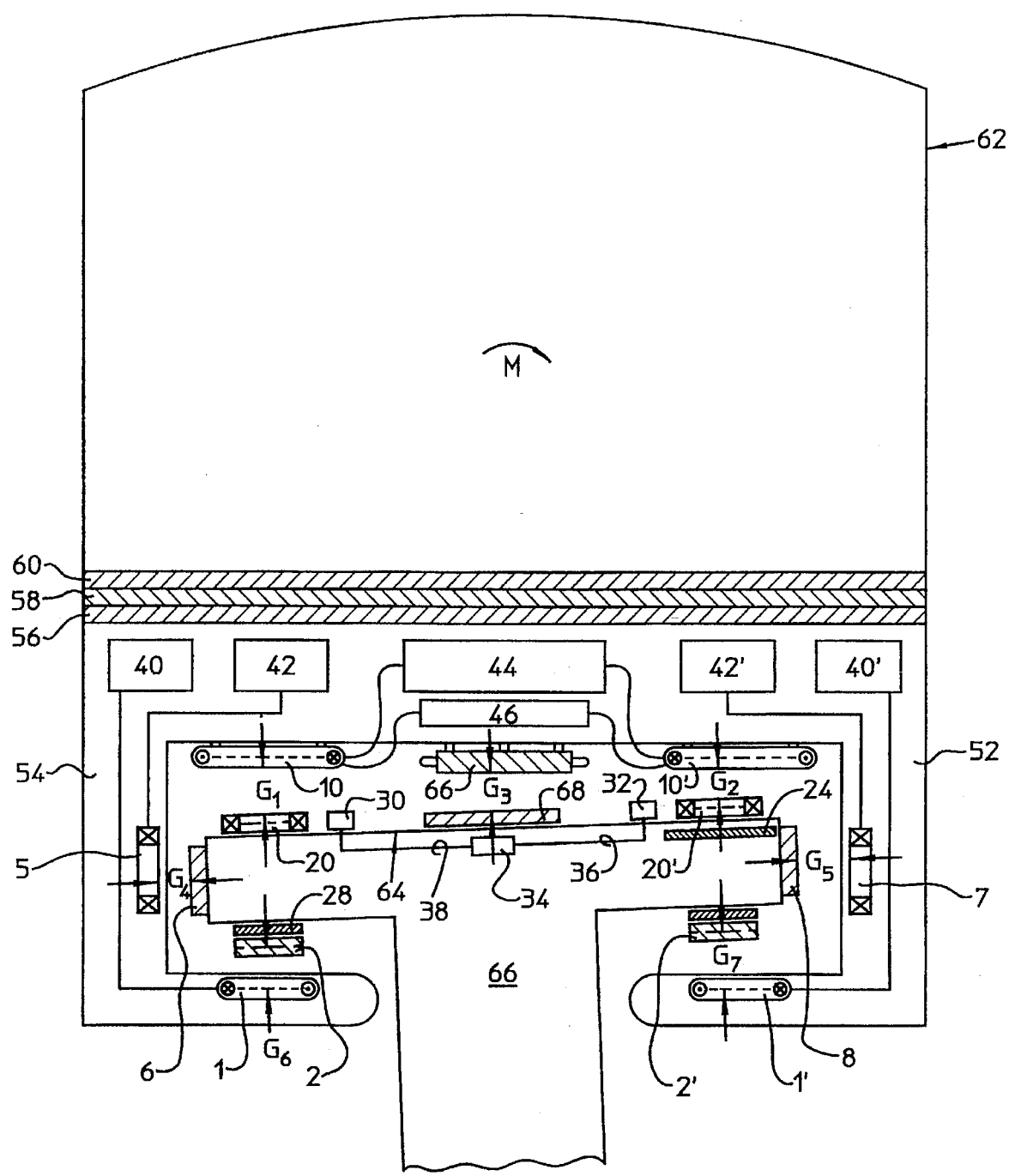
FIG. 12 is a schematic representation of a cross section of a vehicle in a T-shaped guideway.

FIG. 12 shows maglev vehicle 62 situated above guideway 66 having top surface 64 and with a T-shaped guideway cross section composed on non-ferromagnetic, non-conducting structural material suitable for heavy loadings. Vehicle 62 has outrigger arms 54, 52 and passenger compartment floor 60 with magnetic shielding 58 and conductive shielding 56 also used for structural support and vehicle cross member. The vehicle is propelled by propulsion motor primary 66 interacting with guideway mounted secondary electrical member 68 if a linear induction motor is specified. Alternately, if a linear synchronous motor is chosen, unit 66 is the field magnet or secondary electrical member and the guideway mounted member 68 is the stator or primary electrical member being fed electrical power from the wayside power substation. Vehicle main levitation magnets 10 and 10' interact with corresponding secondary electrical members 20, 20' over vertical airgaps $G_1$, $G_2$ and magnets 10,10' are mounted to the bottom of the vehicle undercarriage 50. Magnets 10, 10' also interact with null-flux coils 30, 32 respectively whereby a current regulator 34 is interposed between coils 30, 32 and can develop currents of differing magnitudes in connecting lines 36, 38 to assist with roll compensation. Secondary electrical member 20 is mounted on guideway upper surface 64 without ferromagnetic backing and may be composed of discrete electrically-conductive coils, a conducting ladder arrangement or a flat conductive strip according to the speed and force characteristics of the systems. Secondary electrical member 20' has a different time constant than 20 and is shown attached to ferromagnetic backing plate 24 which is on the opposite side of 20' from the side facing the airgap $G_2$. In the particular case shown whereby $G_1 > G_2$, then levitation force developed by the components 10 and 20 will exceed that developed by components 10' and 20'. Members 20 and 20' are normally passive and members 10, 10' are normally active and excited electrically for the same magnetomotive force by power supply 44 mounted on support 56.

Auxiliary levitation magnets 1, 1' are mounted on the vehicle outrigger 54, 52 and interact with guideway mounted tertiary electrical members 2, 2' which are arranged with their plane in a horizontal orientation and vertically positioned with airgaps $G_1$, $G_2$ which are different when the vehicle experiences a roll moment. It is an important feature of this invention that member 2 be mounted underneath tertiary ferromagnetic member 28 to either lower the repulsive levitation force on the left side below that produced by members 1', 2' or to create an electromagnetic attractive force between members 1, 2 while members 1', 2' remain in repulsive force mode. This creates a controllable roll moment M or electromagnetic banking even in the case of a level guideway 66. It is intended during roll maneuver that member 1 will have a different magnitude of magnetomotive force (MMF) from member 1' and in the specific embodiment shown in FIG. 12, the member 1' will require a larger MMF than that for member 1. Corresponding to this condition, a power supply 40' feeding auxiliary levitation magnet 1 must produce a higher power output or higher current that the power supply 40 which operatively feeds auxiliary levitation magnet 1. For the specific embodiment shown, tertiary electrical member 2 has a lower magnetic reluctance than member 2' to the pressure of tertiary ferromagnetic member 28 due to the presence of tertiary ferromagnetic member 28 and consequently the terminal impedance of member 1 will be higher than the terminal impedance of member 1 for the condition $G_7 > G_6$. Power supplies 40 and 40' are separately controlled and may be a DC supply, or AC supply, or a hybrid DC/AC power supply. The command signals for 40 and 40' are derived from either a vehicle-mounted or wayside mounted master control system which determines the proper amount of electromagnetic banking for speed conditions, passenger comfort levels or response to abnormal conditions such as side-wind loading or weight differential across the vehicle width.

Lateral control magnets 5, 7 are spring-mounted with their major plane in a vertical direction on the vehicle outrigger 54, 52 and are operatively connected to power supplies 42, 42 which are in the preferred embodiment variable frequency, variable voltage AC power supplies. Lateral control magnets 5, 7 interact with guideway mounted lateral control member 6, 8 which are passive, electrically conductive coils or strip conductor without use of ferromagnetic inserts in the members 6, 8. If it is desirous to have an asymmetrical lateral force developed between pair 5–6 and pair 7–8, then it is a necessary aspect of this invention to have member 6 of a different time constant than member 8 while retaining identical construction and materials for magnets 5, 7. For example, if dynamic vehicle conditions or perturbations from outside the vehicle demand, in the interests of vehicle stability, that airgap $G_5$ should be greater than airgap $G_4$ as shown in FIG. 12 then it is advantageous to have lateral control strip 78 with a larger electrical time constant than lateral control strip 6. In practice, member 8 would have a greater volume of conductor per unit of guideway length manifest as either an increase in vertical height or transverse width (thickness) of the member or both in contrast to the dimensioning wire with either AC or DC excitation or alternately can be wound of normal conducting wire on a ferromagnetic core. These members are designed to maximize their repulsive force characteristic which is achieved by having a pole-pitch to airgap ration exceed 3.1.

Members 1, 1', 5', 7, 10, 10' may be cryogenically cooled if superconducting excitation is used or alternately these members may be air-cooled, water-cooled or other suitable fluid coolant used. The preferred embodiment in FIG. 12 shows members 10, 10' as superconducting magnets with associated refrigerator/liquifier 46 feeding the two members whereas members 1, 1', 5, 7 are shown as non-superconducting and use a combination of conduction cooling to the vehicle outrigger 52, 54 and convection cooling from the ambient air in the airgaps $G_4$, $G_5$, $G_6$, $G_7$.

It should be apparent to anyone skilled in the art that the arrangement shown in FIG. 12 can be readily adapted to impart a vehicle roll moment in the direction opposite as shown by relocating tertiary ferromagnetic member 28 to be on top of member 2' instead of 2, and secondly by relocating member 24 to be underneath member 20 instead of 20' accompanied by corresponding changes in excitation level for members 10, 10', 1 and 1'.

Figure 13:
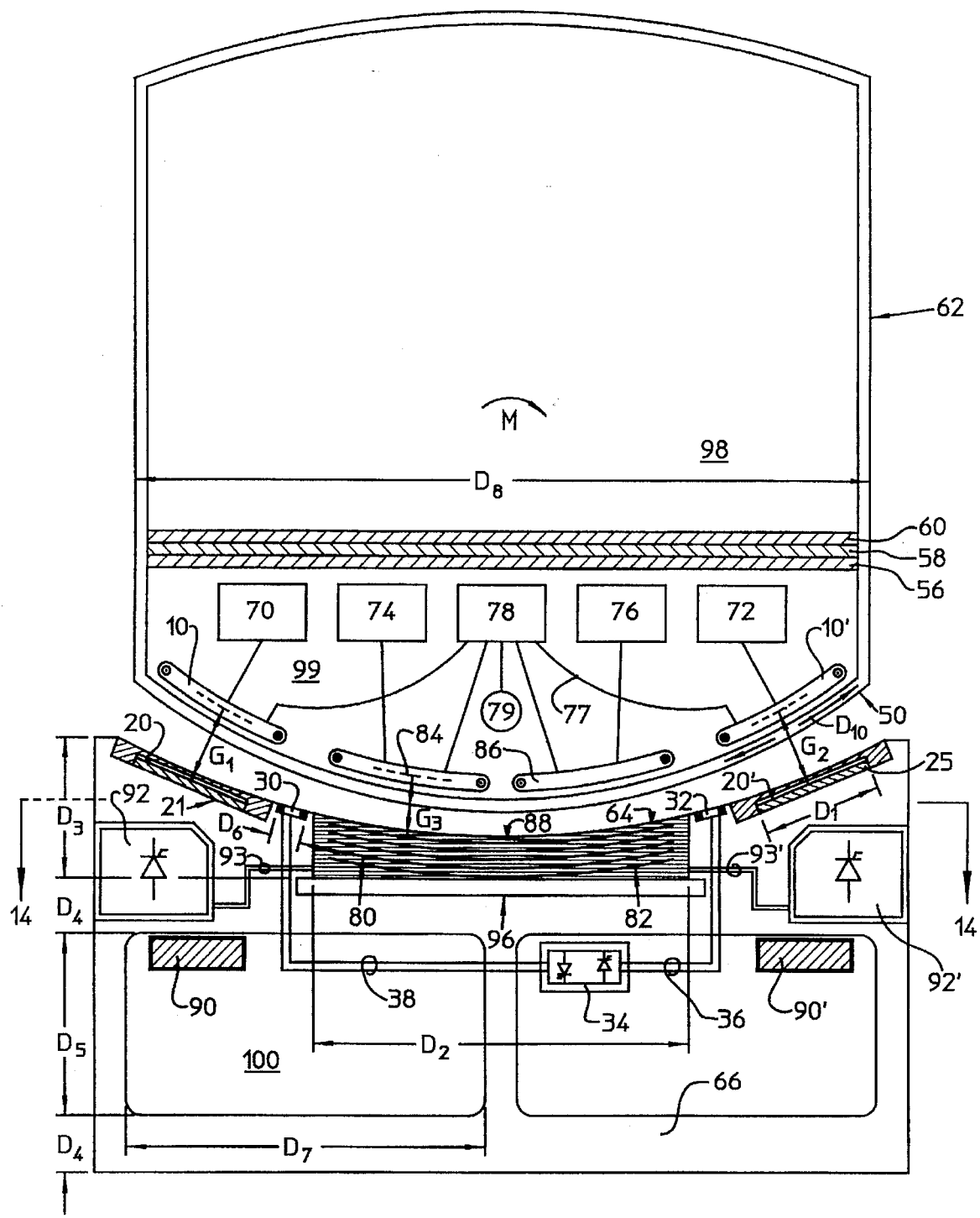
FIG. 13 is a schematic representation of a cross section of a vehicle situated above a semi-circular guideway.

FIG. 13 shows maglev vehicle 62 situated above semi-circular guideway 66 having top-surface 64 with the contour of this surface matched to the contour of the vehicle undercarriage 50 to yield a nearly constant vertical airgap between vehicle and guideway in both steady-state and sway conditions. The guideway structural material 66 is composed of nonferromagnetic, non-conducting structural beams or concrete with fiberglass reinforcing. Vehicle 62 contains 4 arrays of superconducting magnets, labeled 10, 84, 86, 10' whereby each array is longitudinally disposed in sets of magnet subassemblies with alternating polarities. Looking transversely, the 4 arrays are polarized in an alternating sequence such as N-S-N-S which is also effective in attenuating stray magnetic field s in the passenger compartment, 98. The vehicle is propelled by a linear synchronous motor (LSM) in a dual array with the vehicle carrying the dual field excitation magnets 84, 86 which establish the primary magnetic field in the airgap $G_3$. Magnets 84, 86 interact with guideway mounted armature windings for the lawyer synchronous motor 80, 82 which are composed of multiple linear synchronous motor 80, 82 which are composed of multiple layer air-core windings and generally without ferromagnetic material core. The windings 80, 82 are encased in an armature tray 96 held by a non-conductive potting agent such as epoxy resin and on top of the windings 80, 82 is embedded a null-flux lateral guidance ladder 88 of conductive material. The advantage of the dual field/dual armature LSM is that each side has independent repulsion force characteristics independent of propulsive thrust output. LSM windings 80, 82 are actively fed from stationary power conditioning unit 92, 92' providing variable-voltage, variable-frequency power for speed/thrust control of vehicle. Three-phase power cables 93, 93' operatively connect windings 80, 82 with power conditioning units 92, 92'.

Vehicle main levitation magnets 10, 10' interact with corresponding secondary electrical members 20, 20' through airgaps $G_1$, $G_2$ respectively and magnets 10, 10' are mounted in the vehicle undercarriage compartment 99 facing the guideway. Magnets 10, 10' also interact with and induce current in guideway-mounted null-flux loops 30, 32 and can develop alternating current of differing magnitudes in connecting lines 36, 38 responsive to lateral perturbations of the vehicle from the centerline position, sway or roll motions. The current induced on null-flux loops 30, 32 acts in a fashion to restore the vehicle to a centerline or stable lateral position due to the direction of the electromagnetic forces created by the interaction of the magnetic field originating from magnets 10, 10' and the induced current in null-flux loops 30, 32. Current regulator 34 is interposed between loops 30 and 32 and allows for loop 30 to have a greater current than loop 32 or vice versa for the purpose of creating a differential in lateral restoring force between the two sides of the guideway albeit both 30, 32 act in the same direction to restore the vehicle's lateral centerline when a lateral perturbation occurs.

Secondary electrical member 20 is mounted on the guideway in a tray 21 and designed with a contour to be flush with upper surface of the guideway 64. In FIG. 13, member 20 is composed of an electrically conductive ladder, loop or short-circuited (closed-path) loop without ferromagnetic backing or ferromagnetic core, whereas secondary electrical member 20' has a ferromagnetic back-iron plate or ferromagnetic core. This arrangement causes member 20 to have a lower self inductance than member 20' due to the smaller magnetic reluctance of the magnetic path surrounding 20 versus the path surrounding 20'. Additionally member 20 will, as shown in FIG. 13, have a smaller time constant than 20'. This differential in time constant is advantageous for producing a differential in leviation force between left and right sides assuming that the vehicle magnets 10, 10' are excited at identical MMF. For the specific arrangement of FIG. 13, the levitation force produced by the pair 10–20 will exceed that produced by pair 10'–20' resulting in a net roll moment or torque direction as indicated by "M." This will tend to decrease airgap $G_2$ and increase airgap $G_1$ about the steady state or straight guideway condition and thus create electromagnetic banking without need for active control. The rate at which the airgaps $G_1$, $G_2$ change in response to the differential in levitation force is dependent on the rotational inertia of the vehicle and the electromagnetic damping provided. The system provided results in an inherently stable operating mode in that the vehicle roll moment is damped by the electromagnetic induction action occurring in the secondary electrical members.

For the embodiment shown in FIG. 13, there is provided 3 mechanisms of lateral restoring force production:

1. Null-flux ladder 88 (passive)
2. Null-flux loop 30–32 (passive) with induced current regulator (34)
3. Lateral force developed by levitation magnets 10, 10' interacting with guideway levitation conductor 20, 20'.

Prior art describes the use of a centrally-mounted surface ladder for the null-flux conductor when used in conjunction with 2 vehicle mounted field magnets comprising a dual linear synchronous motor. There is no active regulation with this scheme but because of the low inductance of the ladder conductor, high currents and high forces are developed for lateral restoring. It is important that magnets 84 and 86 must be excited in a North-South fashion to permit a null-flux condition to exist in the center zone of the guideway being enclosed by ladder 88. This mechanism can typically provide 40–50% of the vehicle's need for lateral restoring force. In addition, the controlled null-flux loops 30, 32 act as an independent system from 88 and in general 30 or 32 has a smaller time constant than 88. The system is arranged in FIG. 13 so that when the vehicle experiences a positive roll (clockwise direction), loop 30 is mostly effective, has the highest induced current and results in a restoring force to center the vehicle. Conversely, when the vehicle experiences a negative roll (counterclockwise), loop 32 has high induced current which flows through cables 34 and into the shunt current regulator 34 for current limiting (phase-back thyristor modulation) or full-conduction, maximum loop current.

Power supply 70, 72 feeds either single-phase alternating current or direct current to levitation magnets 10, 10' respectively; the magnitude of this supply cannot be adjusted for fast change of current due to limitations on internal heating in the superconductor in 10, 10'.

Power supply 74, 76 is a direct-current power supply for example with a 1500 Amp terminal rating for energization of each propulsion magnet 84 or 86 separately. The propulsion magnets are excited to a level of 500,000–600,000 amp-turns and may use commercially available superconducting wire such as Nb-Ti or $Nb_3Sn$.

In the embodiment shown in FIG. 13, all 4 vehicle magnet arrays are cooled by a common refrigerator/liquifier 78 which has cryogenic fluid reservoir 79 and feed/extraction coldlines 77 to each vehicle magnet. The refrigerator/liquifier 78 would in the most general embodiment include provisions for a compressor, controls, pressure regulator and valving.

It should be apparent that a minimal amount of electric power is required on board the vehicle due to the low losses of the superconductor; this power may be provided by a better, air turbine-generator or fuel cell and typically 125–185 kW for a full-scale 100 passenger vehicle. By contrast, the guideway inverter units 92, 92' must impart between 7 MW and 15 MW to the linear synchronous motor armature windings to propel said vehicle. FIG. 13 shows a preferred location of the AC or DC power bus duct 90, 90' in the open space compartment 100 below the upper guideway components. Ducts 90, 90' contain a system of DC or poly-phase AC solid conductors with current in the range of 2,000–6,000 amps and a voltage rating of 1500 to 4160 volts rms.

Table 1 gives dimensions and characteristics for principal components shown in FIG. 13 specific to a 300 mph system with a 67 ton vehicle.

Figure 14:
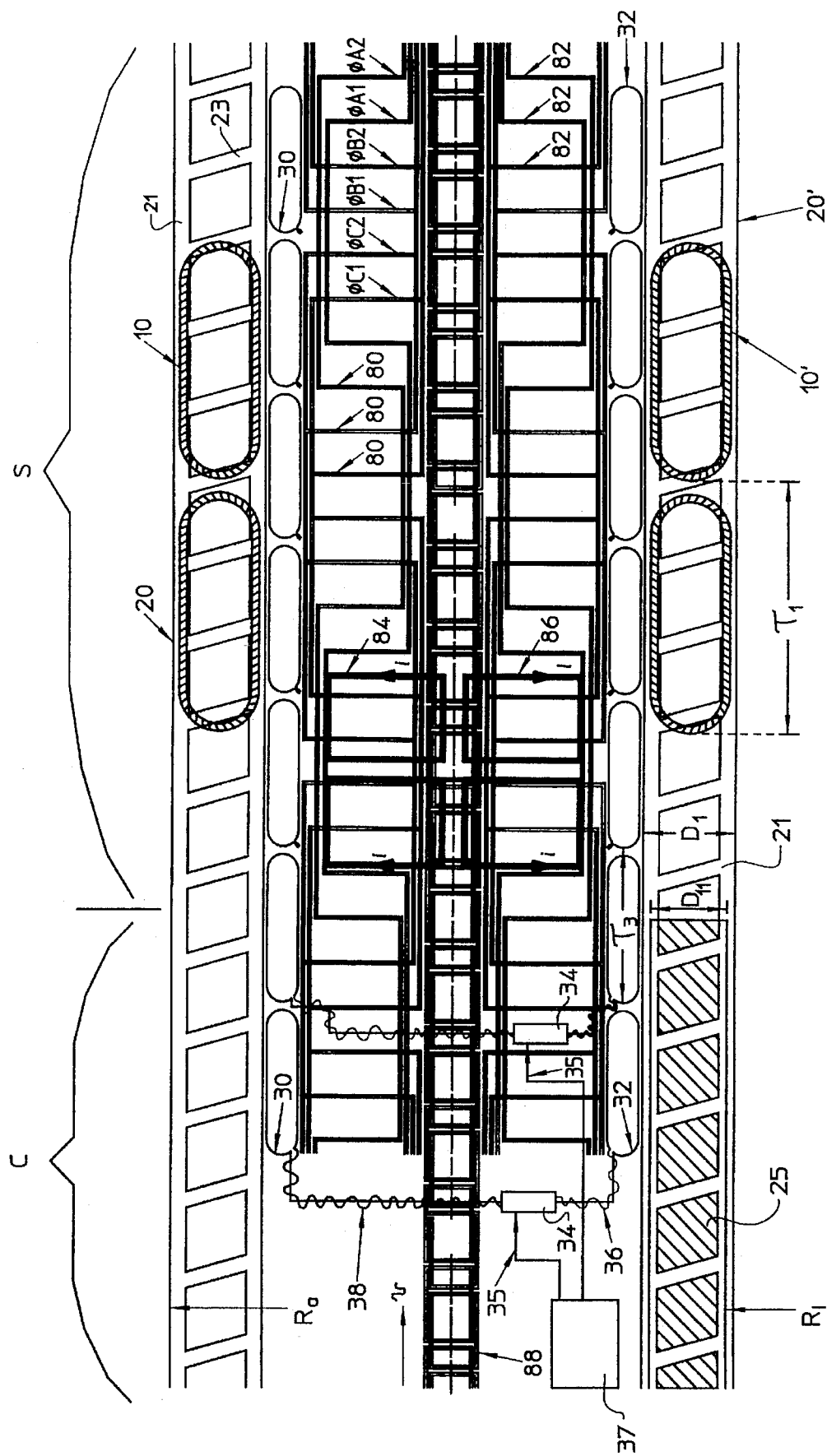
FIG. 14 is a schematic representation of a top view of a guideway corresponding to Section 14—14 of FIG. 13.

FIG. 14 shows a top view of the guideway corresponding to section Y—Y of FIG. 13 and superimposing the vehicle field magnets 84, 86 and levitation magnets 10, 10' on top of the guideway components. It should be clear that although the FIG. 14 only shows 2 magnets 10, 10' per side that the invention covers a multiplicity of levitation magnets arranged in tandem per side, the exact number dependent on the levitated mass and MMF strength/magnet. Similarly, while FIG. 14 only shows two LSM field magnets per side, the invention is applicable to a multiplicity of field magnets arranged in tandem along the direction of travel of the vehicle denoted "V." In the preferred embodiment, the levitation magnets are longitudinally space, periodically at a pitch labeled $\tau_1$ as shown. The LSM field magnets 84, 86 are longitudinally spaced at periodic intervals labeled $\tau_2$ and also referred to as the pole-pitch. The null flux loops 30, 32 are shown spaced at a longitudinal pitch $\tau_3$. The loops 30, 32 are shown connected through electrical power cables 36, 38 to the current regulator 34 which in the preferred embodiment contains a bilateral thyristor pair for the switching device. Two such current regulators 34 are shown in FIG. 14 for simplicity but it is intended that each null-flux loop pair 30, 32 have an independent current regulator that links each set. Optical means or electrical means are provided to gate the bilateral thyristor pair into the conduction mode or partial conduction mode responsive to a wayside vehicle motion control system 37 which is in communication with motion sensor units originating from the vehicle. The optical or electrical input signal line 35 is the preferred means to gate or control current regulator which does not require power from an outside source.

FIG. 14 shows LSM windings 80, 82 and in a preferred embodiment each winding is composed of 6 phases as indicated OC1, OC2, OB1, OB2, OA1, OA2. It is clear that windings 80, 82 are interposed between null-flux loops 30, 32 and the null-flux ladder 88 with small transverse clearances on the order of 25–100 mm. Null-flux ladder 88 as shown is specific to the use of a dual LSM propulsion motor with requisite dual field coil arrays as shown. The ladder may be a continuous preformed metallic, conductive strip for example a punched aluminum strip or as shown in FIG. 14, a series of overlapping rectangular conducting loops is sufficient and constitutes the preferred embodiment. The amount of longitudinal overlap of loops or the spacing pitch is an important factor and established by the operating speed of the vehicle and the pitch of the propulsion field magnets 84, 86. In the example shown, the null flux loops have a $\frac{2}{3}$ or approximately 67% pitch overlap and are composed of aluminum or copper without ferromagnetic cores or ferromagnetic structural supports.

The secondary electrical member 20, 20' constituting the leviation component is composed of longitudinal conductive members 2 which are electrically joined to rungs 23 which are conductive but not necessarily of the same conductivity as 21. In the preferred embodiment, 21 and 23 are stamped as a ladder assembly out of high conductivity aluminum Type 6101-T64 plate; thus avoiding major welding of parts. FIG. 14 shows guideway section denoted "S" for straight section and denoted "C" for curved section, which in a maglev system is a gently curve with typically a radius of horizontal curvature of 1.6–2.0 km. In section "S" both members 20 and 20' are without ferromagnetic inserts, back-iron or other apparatus to cause a differential in the self inductance or time constant between 20 and 20'. The major radius is designated $R_o$ and the minor radius is denoted $R_1$. If the intended minor radius occurs along member 20' (as shown in FIG. 14) when the vehicle enters a curved section "C," the first and subsequent leviation magnets 10' on this side of vehicle will experience a drop in leviation force, an increase in lateral stabilizing force and a change in the electrical time constant of the secondary electrical member 20' which is coupled by induction to the primary or vehicle-based levitation magnets. By contrast, the levitation magnet 10 on the major radius at the edge of member 20 will not have any change in levitation force, time constant or lateral stabilizing force upon entering the curved section.

It should be clear from FIG. 14 that the inclusion of the flat, monolithic secondary ferromagnetic plate 25 underneath secondary electrical member 20' constitutes the means by which to change the electrical time constant, the reflected impedance into the vehicle levitation magnets and to increase the lateral restoring force/lateral stability of this one side of the vehicle. The plate 25 in the preferred embodiment is dimensioned to have at least the transverse width of the corresponding levitation magnet but designed to be smaller in width (denoted D11) than the width D1 of the member 20'. The thickness of plate 25 is determined by the total magnetic flux generated by the vehicle magnet 10', the vertical airgap, pitch $\tau_1$ and saturation characteristics of the steel. Other physical arrangements of member 25 other than a flat plate are possible such as a plate with side ears to enclose the pieces 21 or to laminate the plate to reduce eddy current losses. In an alternate embodiment, instead of a ferromagnetic plate, a solid high-conductivity plate underneath the member 20 in the curved zone "C" would increase the levitation force and also change the electrical time constant by reducing the self inductance of the secondary member and reducing the dynamic impedance as reflected into the primary 10. The invention includes both means by fitting of a conductive plate and a ferromagnetic plate to provide for a transverse differential in levitation force to either correct for a roll moment imparted by outside forces or to purposely provide electromagnetic banking to maintain better dynamic stability and passenger comfort levels around high speed curvature.

Table 2 is a specification for electrical members 20, 20', 30, 32, 36, 38 constituting the null flux loops, secondary member, cables and current regulator, specific to the preferred embodiment shown in FIG. 14. The preferred embodiment uses an array of 50 vehicle magnets per side with a pitch of 0.65 m and excited to an MMF level of 600 KAT using niobium-tin (Nb$_3$Sn) superconducting wire in the magnet windings which are cooled to 8 K and operated at a current density of 12,500 A/sq. cm.

Figure 15:
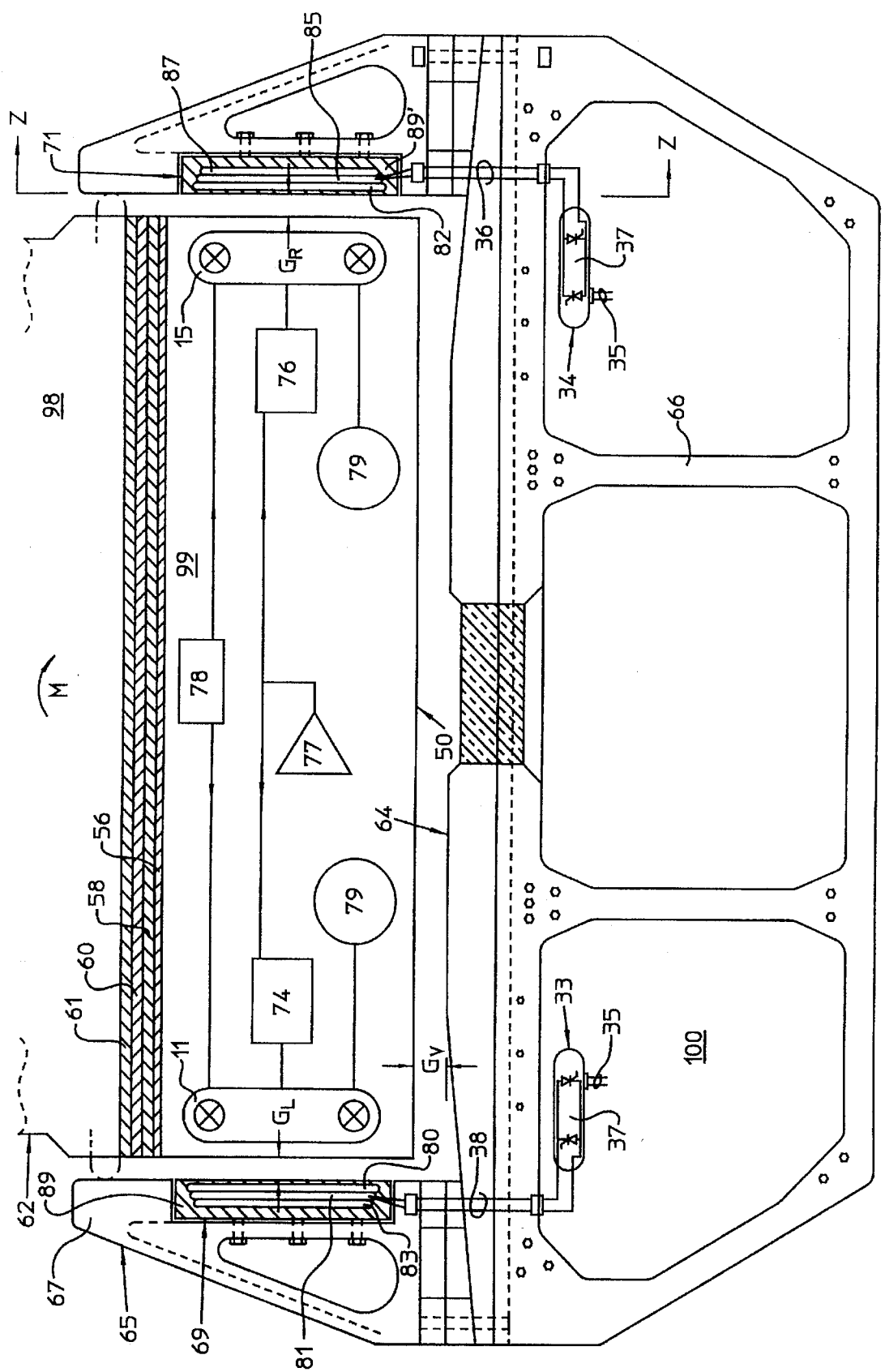
FIG. 15 is a schematic representation of a cross sectional side view of a U-channel guideway supporting a vehicle.

FIG. 15 shows a U-channel guideway 65 supporting maglev vehicle 62 and forming three principal airgaps G$_V$, G$_L$, G$_R$. The vehicle contains an array of left-side levitation magnets 11, right-side levitation magnets 15 in communication with and acting on a combined system of levitation, propulsion and lateral stabilizing coils mounted in the guideway sidewall 67. On the left side, the linear synchronous motor armature 80, the null flux loop 81 and short-circuited levitation conductor 83 are mounted in the same stator tray 69 and without ferromagnetic pieces or ferromagnetic supports. In a curved section of guideway, assuming to be curving to the right, in the stator tray 71 on the right side, there are four components: linear synchronous motor armature 82, null flux loop 85, short-circuited levitation conductors 87 and ferromagnetic pole piece 89 which is specific to the invention. Pole piece 89 changes the inductance of all three windings or coils 82, 85, 87 in the tray 71 but reduced the lateral repulsive force between the vehicle magnet 15 and the stator tray 71 or sidewall as compared to the level of repulsive lateral force generated by magnet 11 n the left sidewall members. The net result is an increase in coil inductance for coils 82, 85, 87, an increase in their electrical time constant and an increase in the reflected impedance as seen by the vehicle magnet 15. Since the LSM has a series connected stator for typically 205 km, the increase in coil inductance over a 500 m long curvature for one side of the stator has little consequence on the overall LSM performance except an increase in terminal voltage.

FIG. 15 shows null-flux loops 81 and 85 being operatively connected via electrical power cables 36, 38 to separate, dedicated current regulators 34, 33 respectively, which has control signal input lines 35 for either optical or electrical gating of the semiconductor switches 37, which are shown as thyristor devices.

In this system, levitation, lateral guidance and propulsion functions all use a common vehicle superconducting magnet 11, 15 and placement of the guideway components for these systems in a vertically orientated tray common to all 3 systems.

There is no need for electrical components to be mounted on the vehicle undercarriage outer surface 50. Vehicle shielding for the passenger compartment 98 is accomplished by a four-layer shield separating the equipment compartment 99 from passenger compartment. Layer 61 is a ferromagnetic plate acting also as a floor; layer 60 is a conductive shielding plate; layer 58 is a ferromagnetic shield plate; layer 56 is a conductive shield and structural support for mounting of undercarriage equipment. Power supplies 74, 76 feed magnets 11 and 15 which in turn is feed from power source 77 which may be a fuel cell or battery. Supplies 74, 76 being variable-voltage, variable frequency power conditioning units. Each magnet is fed a cryogen such as liquid helium or nitrogen from refrigerator/liquifier/compressor unit 78 which includes a temperature control system and cold-head. Each magnet has a separate reservoir 79 for the cryogen and independent pressure and flow regulators.

The current regulators 34 for the null-flux loops are intended to be spaced at periodic intervals along or underneath the guideway. For example, if the pitch of the null-flux loops is 0.57 m, then it is appropriate to have one current regulator every 0.57 m for as long as a curved section exists. When in a straight section, there is no need for the differential current/force control subject of this invention unless for special operating feature, the system needs to have electromagnetic banking on a straight guideway.

Figure 16A:
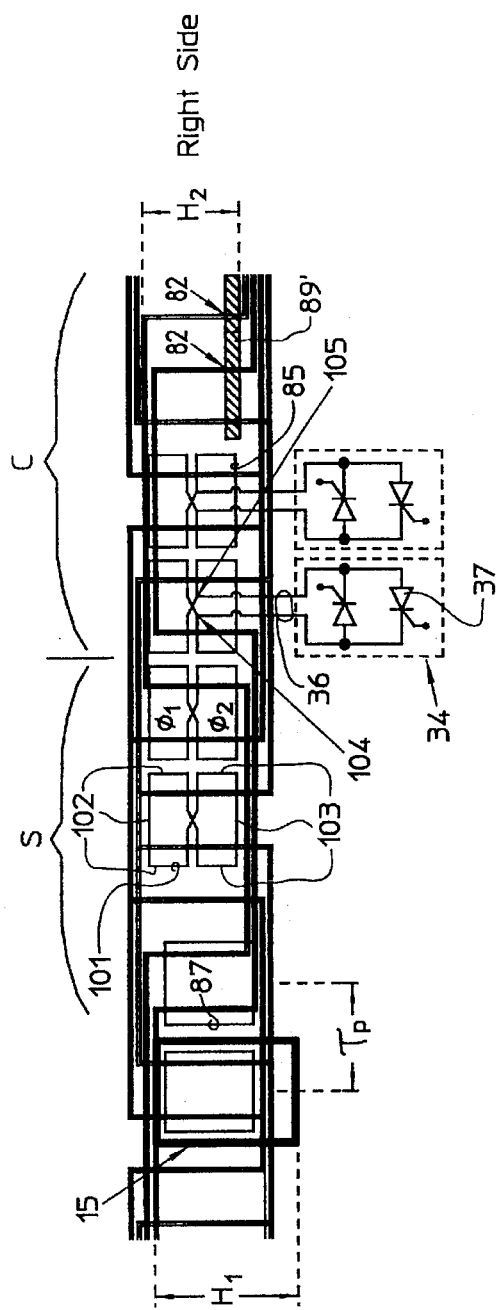
FIG. 16a and FIG. 16b are schematic representations of an overhead view of a right side and left side, respectively, of a ferromagnetic pole piece in the lower portion of the null-flux loops.
Figure 16B:
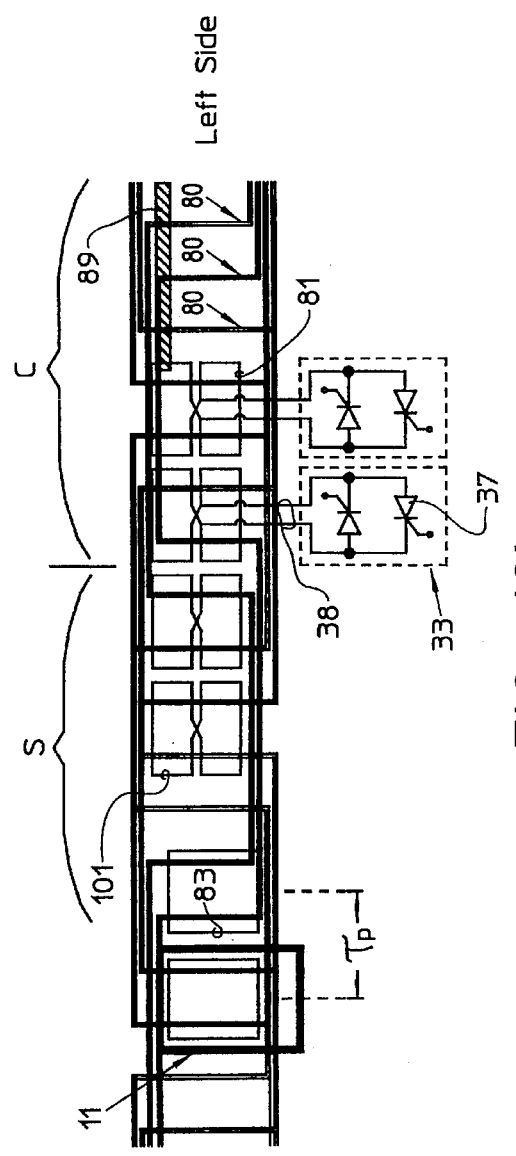

Reference sectional lines Z—Z in FIG. 15 for the view shown in FIGS. 16a and 16b. FIGS. 16a and 16b show a side view of the guideway looking in the longitudinal-vertical plane to show the layout of members 82, 85, 87 as each component has a specific layout which is not fully shown by the vertical-transverse drawing of FIG. 15. Vehicle magnet 15 is shown superimposed on top of the three principal guideway electrical members, magnet 15 may be either a single magnet or a multiplicity of magnets spaced at a pitch of $\tau_p$ as indicated in the figure. Levitation conductors 87 are arranged on guideway in an array with longitudinal pitch $\tau_p$ in the preferred embodiment.

It is an important feature of this system that in straight sections "S" the null-flux loops 101 are included on each sidewall but without any current regulator or insertion of ferromagnetic pieces or other apparatus to alter the electrical time constant, impedance or current versus repulsive force characteristics. Loops 101 comprise two rectangular loops of approximately full pole-pitch $\tau_p$ in length but each loop has upper 102 and lower 103 conductors which have a vertical height of approximately 45% of the vehicle magnet 15 vertical height H$_1$. The loop conductors 102 and 103 are connected in series null-flux i.e., with electrically opposing polarities such that there is no net induced voltage around the loop until magnetic fluxes $\Phi_1$ and $\Phi_2$ are different due to vertical perturbations of magnet 15.

In curved section "C" subject of the invention, null-flux loops 81 again comprise upper 102 and lower 103 conductors which add tap points 104 and 105 to connect outgoing power cable 36 to the external current regulator 34. Thus when a differential exits between magnetic fluxes $\Phi_1$ and $\Phi_2$, the amount of current build-up in the loop 81 can be increased on one side and simultaneously reducing the current on the other side of the loop. For example, magnet 15 is shown in a vertical position lower than steady-state condition and thus when passing over loop 81 in the curved zone will produce flux $\Phi_2 > \Phi_1$ and consequently the voltage induced around the loop with conductors 103 will exceed the voltage for conductors 102. In the case when it is desirable to purposely develop roll moment M (reference FIG. 15) for electromagnetic banking, then it is essential that the thyristors 37 in current regulator 34 be switched on so as to cause current to flow in line 36. This will insure that the induced current in conductors 103 exceeds that in conductors 102. In the preferred embodiment, the means of control is by shunting current away from the guideway null-flux conductors which experience the lower vehicle induced voltage.

FIGS. 16a and 16b also show the addition of a ferromagnetic pole piece 89' in the lower portion of the null-flux loops, surrounding conductors 102 for the purpose of creating an additional differential in the magnetic flux conditions. It is understood that piece 89 is underneath the entire group of 3 electrical components 85, 82, 87 in the stator tray 71 and may or may not extend more than one-half of the height $H_2$ of the null-flux loops. FIGS. 16a and 16b is applicable with a clockwise roll moment; otherwise, if a counterclockwise roll moment is desired, then the locations of pole pieces 89, 89' are reversed i.e. pole-piece 89' is placed in the top portion of stator tray 71 and pole-piece 89 is located in the lower portion of stator tray 69.

Figure 17A:
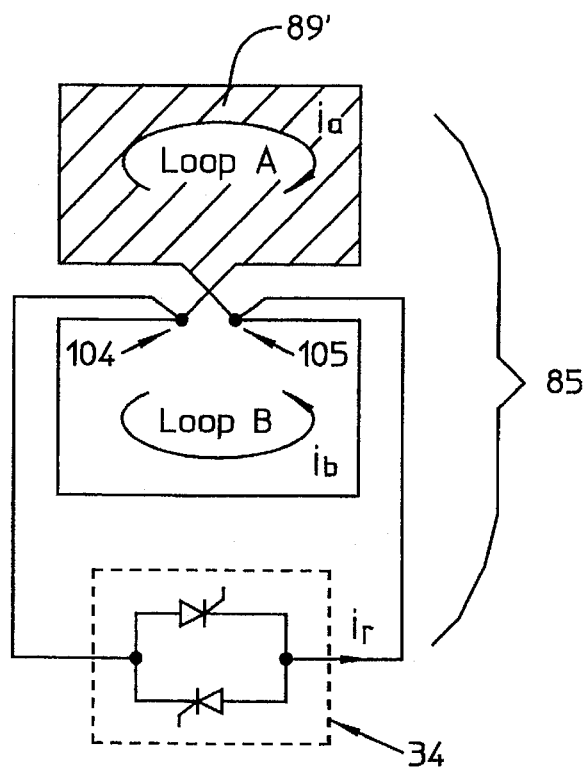
FIG. 17a is an elementary drawing of a null-flux loop.
Figure 17B:
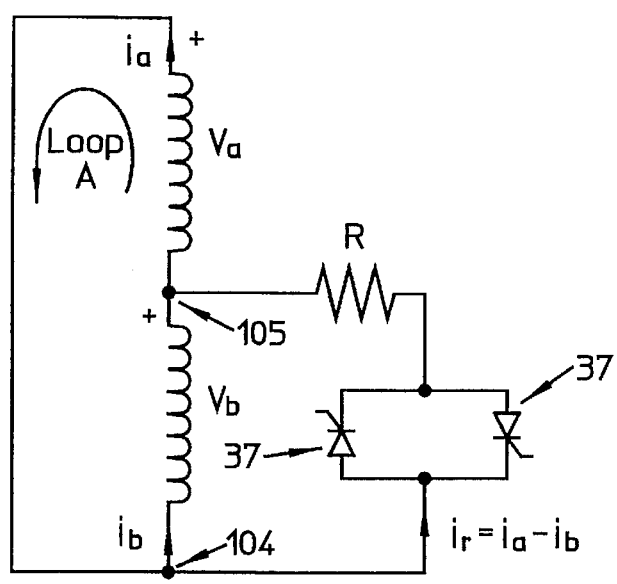

FIG. 17b shows the simplified electrical schematic for one null flux loop corresponding to the elementary drawing shown in FIG. 17a appropriate to FIGS. 16a, 16b and 15. The regulator current is defined as $i_r$, loop A (upper) current is defined as $i_a$, loop B (lower conductors) current is defined as $i_b$. By Kirchoff's Law, we have $i_r + i_b = i_a$ where $i_r$ can be a controllable current from zero up to a value, when in full conduction of the greater of $i_a$ or $i_b$. For example, if $i_a$ is marginally greater than $i_b$ with thyristors 37 in partial conduction, then if 37 is put into full conduction mode, $i_r = i_a$ and $i_b$=zero. The force developed by each loop is proportional to the rms value of current since the field coil 15 or 11 is at constant excitation. By creating a differential in current from lower to upper loops, the roll moment of the vehicle is compensated or a deliberate roll is imposed which is controllable by the phasing of thyristors 37 in the current regulator. Resistor R is the critical resistance of the cabling from the guideway sidewall to the regulator according to type and length of cable used.

The magnitude of repulsive force developed by a short-circuited loop or strip conductor is a function of 4 main design variables.

a. excitation strength (MMF) and pole-pitch of the primary magnet b. the airgap to pole-pitch ratio c. the magnetic Reynolds number, G d. the electromagnetic slip s, for induction action.

When the secondary magnetic circuit contains only conductive components, the direction of force is singular and repulsive. When the secondary circuit contains ferromagnetic inserts or ferromagnetic backing, it is then possible to obtain bidirectional force control when special conditions are met. In the most general case, the vehicle magnet 11 or 15 has AC low-frequency excitation which enables use of the scheme at low vehicle speeds including down to zero speed.

Figure 18:
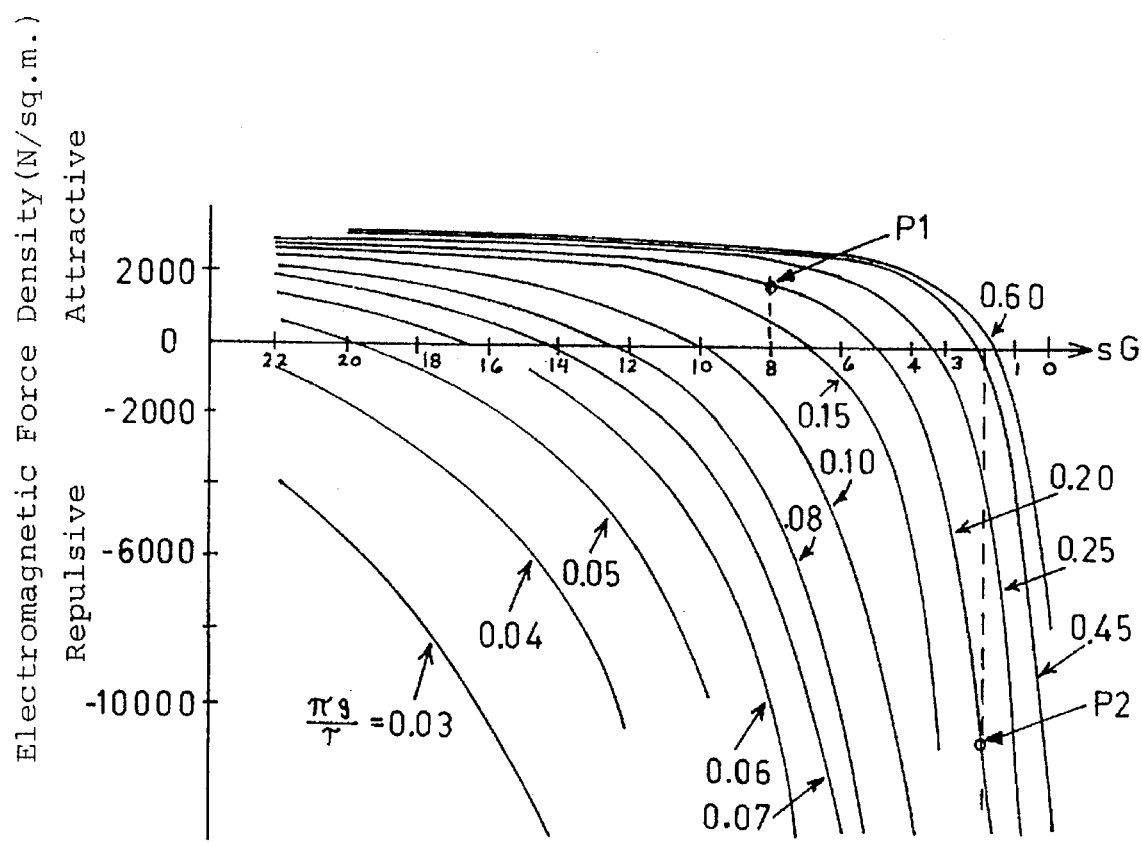
FIG. 18 is a graph showing inherent levitation force and attractive force versus parametric values of Reynolds number electromagnetic-slip product "sG".

FIG. 18 shows an inherent levitation force and attractive force versus parametric values of Reynolds number electromagnetic-slip product "s.G". The family of curves are plotted for variations in the parameter K=πx airgap/pole-pitch. The curve shows both attractive and repulsive operation of a representative curved-zone, sidewall-mounted, null flux loop A (reference FIGS. 16a, 16b, 17a and 17b) with a degree of ferromagnetic backing. In the normal operating mode for the 6.7 ton vehicle, for example with s.G=2 and K=0.20, the optimum slip is 4% and the repulsive pressure developed is −10,600 N/sq.m. surface area. If the slip is increased by inverter action to s=16%, the parameter s.G=8 and the net force changes to be attractive with a pressure loading of 1,820 N/sq.m. The change from attractive mode to repulsive mode is accomplished by a minor retardation in inverter frequency; this change is affected in a period of typically 4 ms.

In one embodiment such as FIG. 15, the null flux loop for lateral stabilizing control operates with a 28 mm levitation gap, a 780 mm pole-pitch and K=0.113 which FIG. 18 shows a cross-over point at s.G=8.85. In general, the cross-over from levitation to attraction occurs in an electrodynamic system at: K.s.G=1.0

With a larger excitation magnet in longitudinal dimension or pole-pitch, with a design speed up to 134 m/s (480 km/hr), the levitation cross-over occurs at s.G=1.0/K=5.0; this has a pole-pitch of 2.79 m which indicates an upper inverter frequency of 25 Hz for a 4% operating slip. This 25 Hz excitation to the vehicle main field magnet array is within state-of-the-art specifications for a multi-filament, twisted superconductor.

FIG. 18 shows that if the design can yield K=0.045 or less, then the entire operation will be repulsive independent of the slip-Reynolds number product. FIG. 18 is specific to an excitation loading of 100,000 Amps per meter longitudinal with alternate loadings being proportional to the square root of the repulsive/attractive force produced.

The electrodynamic levitation force is strongly dependent on the slip times Reynolds number product. The magnetic Reynolds number is calculated as:

$$G = \frac{2 T^2 \mu_o f t'}{\rho g RF \pi}$$

where

T=stator pole pitch (m)

f=excitation frequency (Hz)

p=resistivity of secondary conductor (ohm-m)

g=airgap between stator pole to secondary Fe plate (m)

t'=effective thickness of secondary plate (m)

RF=Russell & Norsworthy Factor for overhang dimension (applicable to ladder or strip type secondaries only)

Substituting values of T=2.79 m, f=24 Hz, p=2.17×10⁻⁸, g=0.069, RF=1.43, t'=0.019 the resultant factor is G=120. From inspection of FIG. 18 it is seen that for the parametric curve πg/T=0.08 (which is appropriate to the 6.7 ton vehicle), a high resultant repulsive density would require a slip x Reynolds number product of s.G=7.0 or less to produce a force density of at least 10,000 N/sq.m. The operating slip is then established at s=7.0/G=0.058 per unit.

TABLE 1

| Operational Characteristics and Dimensions of the Reference Maglev Vehicle (shown in FIG. 13) | |
| --- | --- |
| Capacity range | 76, 118 or 200 passengers |
| Overall length | 15, 23 or 39 m |
| Width (nominal) | 3.12 m |
| Height (nominal) | 3.2 |
| Aerodynamic drag coefficient | 0.26 |
| Nominal laden weight (200 pass.) | 67 tons |
| Acceleration | 1.0 m/sec² |
| Deceleration - normal | 2.5 m/sec² |
| Deceleration - emergency | 10 m/sec² |
| Propulsion | LSM - Dual Stator |
| Upper speed range | 400–500 km/hr. |
| Propulsion magnet refrigeration load | 41–50 kW |
| At Cruising Speed of 500 km/hr. | |
| Max. Continuous thrust | 60 kN |
| Ground clearance | 0.10–0.12 m |
| Magnetic drag (est.) | 12–15 kN |
| Aerodynamic drag (est.) | 35–37 kN |
| Side wind loading (100 km/hr. cross wind) | 70 kN |

TABLE 1-continued

Operational Characteristics and Dimensions of the Reference Maglev Vehicle (shown in FIG. 13)

| | |
|---|---|
| Guideway aluminum for levitation strips | 42 metric tons/km |
| Minimum radius at max. speed | 1.6 km |
| Guidance stiffness - nominal-lateral | $4.2 \times 10^6$ N/m |
| Suspension stiffness - nominal-vertical | $3 \times 10^6$ N/m |
| Levitation system - natural frequency | 2 Hz |
| Guidance natural frequency | 0.85–1.0 Hz |
| Levitation Magnet MMF | 385 kAT |
| Substation Electrical Output | 12.9 MVA at 122 Hz |
| LSM Mechanical Output | 8.33 MW |
| Linear Power Generator Output | 475 KW |
| LSM Field Magnet MMF | 600 kAT |

Dimensions

| | | |
|---|---|---|
| $D_1$ = 550 mm | $D_5$ = 550 mm | $D_9$ = 100 mm |
| $D_2$ = 1600 mm | $D_6$ = 250 mm | $D_{10}$ = 480 mm |
| $D_3$ = 650 mm | $D_7$ = 1525 mm | |
| $D_4$ = 230 mm | $D_8$ = 3120 mm | |

TABLE 2

Specification for Guideway Components for Null-Flux Loops, Null-Flux Ladders and Levitation Strips
Reference FIGS. 13 & 14
Semi-circular Guideway
Vehicle: 67,000 kG mass Baseline Lateral Restoring Force: 210 kN a) Null-flux loops (30, 32)

| | |
|---|---|
| Transverse width | 0.25 m |
| Longitudinal pitch, $\tau_p$ | 0.57 m |
| Conductor cross section | 11 mm × 25 mm |
| Overlap | 0% |
| Inductance | 0.98 micro-Henry |
| Material | Aluminum 6101-T64 |
| Frequency of Induced Current | 117 Hz |
| Reactance at 117 Hz | 114.7 micro-ohm |
| X/R ratio at high speed | 1.10 |
| Resistance at 117 Hz | 104 micro-ohm | b) Null-flux ladder (88)

| | |
|---|---|
| Transverse width | 0.32 m |
| Longitudinal pitch | 0.50 m |
| Conductor cross section | 12 mm × 15 mm |
| Overlap | 67% |
| Inductance | 0.92 micro-Henry |
| Resistance | 111 micro-ohm | c) Secondary electrical member/levitation strips (20, 20') in straight or curved section

| | |
|---|---|
| Width ($D_1$) × depth | 550 mm × 12.5 mm |
| Sidebar conductor width | 5.0 cm |
| Rung longitudinal dimension | 5.0 cm |
| Rung pitch | 51 cm |
| Material | Aluminum 6101-T64 |
| Peak induced current in rung @ 134 m/s | 290,000 Amp | d) Secondary ferromagnetic plate (25) underneath levitation strip (20')

| | |
|---|---|
| Material | Carpenter Steel Type 430FR plate |
| Thickness | 15 mm |
| Width, $D_{11}$ | 480 mm |
| Peak magnetic field | 1.3 Tesla |
| Electrical resistivity | 760 micro-ohm-mm |

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An electrodynamic magnetic levitation and guidance system, said system including the combination of:

a guideway;

a vehicle which travels along the guideway;

an array of secondary conductors arranged along said guideway, said conductors each having a spatially dependent inductance to resistance electrical time constant and a spatially variable coil internal impedance;

an array of uniformly constructed primary field electromagnetic coils on said vehicle which produce a vertically orientated magnetic field to interact with said secondary conductors and developing a levitation force capable of suspending said vehicle in regard to the secondary conductors, said vehicle experiencing two or greater bidirectional electrodynamic forces from the array of secondary conductors and array of primary field coils for creating a differential in levitation force across the width of the vehicle to offset centrifugal forces acting on the vehicle;

a controllable electrical power supply for regulating said primary field coils, said power supply connected to the primary field coils;

null-flux electrical loop control means located on the guideway operative to regulate the magnetic field linking the secondary conductors to the primary field coils, such that the magnetic field produces a differential levitation force across the width of the guideway for offsetting the centrifugal force acting on said vehicle, said control means in communication with said array of field coils.

2. A system as claimed in claim 1 wherein said guideway includes a straight guideway section and a curved guideway section in which said array of secondary conductors has a smaller magnetic reluctance path along the curved guideway section of the guideway than the straight guideway section.

3. A system as claimed in claim 2 wherein the straight guideway section and the curved guideway section each including a T-shaped guide extending along a central axis of the guideway, said curved guideway section having a minor radius and a major radius, said secondary conductors being mounted on upwardly facing surfaces of said T-shaped guide with the secondary conductors near the minor radius of the curved guideway section incorporating a smaller magnetic reluctance at a speed-induced electrical frequency, and the coil conductors near the major radius of said curved guideway section having a larger magnetic reluctance.

4. A system as claimed in claim 2 in which said guideway has a T-shaped cross-sectional configuration extending along a curved path of travel for the vehicle, said curved path of travel having a minor radius and a major radius, said array of secondary conductors being mounted on lower and upper surfaces of the T-shaped configuration of the guideway, the secondary members near the minor radius of the curved path of travel having a smaller magnetic reluctance, and said primary field electromagnetic coils being mounted on the vehicle along each of opposite lateral sides with respect to the T-shaped cross-sectional configuration of the guideway, the primary field electromagnetic coils of the side of the vehicle which is near the major radius of curvature interacting with the secondary conductors having a larger magnetic reluctance.

5. A system as claimed in claim 2 including a guideway bed upon which the guideway is disposed, said guideway includes a U-shaped channel oriented parallel to the direction of vehicle motion with two side walls perpendicular to the bed of the guideway between which the vehicle travels, and including lateral guidance apparatus positioned on the side walls of the U-channel, said lateral guidance apparatus having guidance coils disposed on the side walls, said guide coils on the outside wall of the two side walls along the curved guideway section of the guideway having the smaller magnetic reluctance relative to the magnetic reluctance of the guidance coils on the inside wall of the two side walls along the curved guideway section.

6. The system as described in claim 1 wherein said array of secondary conductors include lateral guidance conductors spatially spaced along the inside of a curved guideway section, said lateral guidance conductors being laterally offset from primary excitation magnets on said vehicle to enhance vehicle dynamic stability.

7. The system according to claim 6 in which said primary field electromagnetic coils comprise a superconducting magnetic array on said vehicle.

8. A system as described in claim 1 in which said array of secondary conductors includes a conductor having a smaller magnetic reluctance on a curved guideway section than the reluctance of a conductor on a straight guideway section and one set of vertically-oriented levitation secondary electrical members along an inside wall of the curved guideway section when a centerline of the curved guideway section is transversely offset from a centerline of primary field coils.

9. A system as claimed in claim 8 in which said guideway has a T-shaped cross-sectional configuration extending along a curved path of travel for the vehicle, said array of secondary conductors being mounted on inside and outside surfaces of the T-shaped configuration of the guideway, the secondary conductors on the inside surface of the guideway the curved path of travel having a smaller magnetic reluctance than the secondary conductors on the outside surface of the guideway of the curved path of travel, and said primary field electromagnetic coils being mounted on the vehicle along each of opposite lateral sides with respect to the T-shaped cross-sectional configuration of the guideway, the primary field electromagnetic coils of the side of the vehicle which is on an outside of the radius of curvature interacting with secondary conductors having a larger magnetic reluctance.

10. A system as described in claim 8 whereby one guidance coil on one side of the curved section has a ferromagnetic core with a high finite relative permeability $U_r > 1$ and an opposing second guidance coil on the other side of the curved section has an air-core construction of permeability $U_r = 1$, the first guidance coil with a smaller magnetic reluctance path than the second guidance coil.

11. A system as claimed in claim 10 whereby a closed electrical circuit linking first and second guidance coils has a shunt current regulator by which to modulate a cross-coupled AC current when operating in null-flux guidance mode thereby providing a differential in electrodynamic restoring force in response to vehicle lateral movements caused by centrifugal force.

12. A system as described in claim 10 whereby a closed electrical circuit linking first and second guidance coils has a shunt current regulator by which to modify relative phase angles between current $i_1$ and $i_2$ generated by guidance coils of differing magnetic reluctance when operating in null-flux guidance mode thereby providing a differential in electrodynamic restoring force in response to vehicle lateral movements caused by centrifugal force.

13. A system as claimed in claim 12 whereby the shunt current regulator serves to modify basic null-flux induced current versus speed profile to have first and second guidance coils with different impedance characteristics yield an electrodynamic force which restore vehicle lateral stability and when full current level is attained for a specific purpose of tailoring of a lateral guidance force specific for each degree of curvature by active adjustment of null-flux current.

14. A system as described in claim 10 whereby the lateral guidance coil producing the smaller magnetic reluctance has a tapered magnetic core which has an effect of concentrating a lateral component of vehicle-induced primary source magnetic flux so as to produce a higher magnetic field at the guidance coil such that, a higher lateral stabilizing force is attained during curved track operation.

15. A system as described in claim 14 whereby the combination of an active control current in a null flux current loop with the incorporation of said ferromagnetic core around said one guidance coil and said air core construction of said opposing second guidance coil results in a differential in magnetic field density and lateral force between two vehicle sides thereby counteracting a vehicle motion-induced centrifugal force on curved track.

16. An apparatus for guiding and levitating a vehicle comprising:

guideway means upon which the vehicle travels; and means for actively controlling differential in lateral guidance or differential in vertical levitation strength of the vehicle by producing a bi-directional force having both repulsive and attractive force modes of operation with respect to the guideway means, said controlling means electrodynamically reactive with said guideway means.

17. A method for guiding and levitating a vehicle comprising the steps of:

guiding a vehicle along a guideway with electrodynamic guidance coils;

actively controlling alternating current induced in the guidance coils to correspond with guideway curvature by producing a bi-directional force having both repulsive and attractive force modes of operation so the vehicle is maintained in a stable position relative to the guideway as it moves around a curve in the guideway and experiences roll compensation.

18. An apparatus as described in claim 16 wherein the guideway means includes a T-shaped guideway having a top surface with a right edge and a left edge, a right side extending from the right edge of the top surface and a left side extending from the left edge of the left side; and wherein the actively controlling means includes a first array of secondary conductors arranged along the right side, a second array of secondary conductors arranged along the left side, a third array of secondary conductors arranged adjacent the right edge along the top surface, a fourth array of secondary conductors arranged adjacent the left edge along the top surface; a first primary field electromagnetic field coil, a second electromagnetic field coil, a third electromagnetic field coil, and a fourth electromagnetic field coil disposed on said vehicle and opposing said first, second, third and fourth arrays of secondary conductors, respectively, as the vehicle moves along said T-shaped guideway.

19. An apparatus as described in claim 18 wherein the actively controlling means includes a null flux loop disposed on the top surface of the T-shaped guideway between the third and fourth array of secondary conductors, said null flux loop regulating a magnetic field linking the secondary conductors to the primary field coils which produces a differential levitation force across the width of the T-shaped guideway for offsetting any centrifugal force acting on said vehicle.

20. An apparatus as described in claim 19 wherein the T-shaped guideway includes a bottom left surface with a bottom left edge and a bottom right surface with a bottom right edge, said right side extending from said bottom right edge and said left side extending from said bottom left edge, and the actively controlling means includes a fifth array of secondary conductors disposed on the bottom left surface adjacent the bottom left edge and a sixth array of secondary conductors disposed on the bottom right surface adjacent the bottom right edge, and a fifth and sixth electromagnetic field coil disposed on said vehicle and opposing said fifth and sixth arrays of secondary conductors, respectively, as the vehicle moves along said T-shaped guideway.

21. An apparatus as described in claim 16 wherein the guideway means includes a T-shaped guideway having a top surface with a right edge and a left edge, a right side extending downward at about a 45° angle from the right edge of the top surface and a left side extending downward at about a 45° angle from the left edge of the left surface; and the actively controlling means includes a first and second array of secondary conductors arranged along the right side and left side, respectively, and a first and second electromagnetic field coil disposed on the vehicle and opposing the first and second array of secondary conductors, respectively, as the vehicle moves along said T-shaped guideway.

22. An apparatus as described in claim 16 wherein the guideway means includes a U-shaped guideway having a top surface with a right edge and a left edge, and a right side and a left side extending from the right edge and left edge, respectively; and wherein the actively controlling means includes first, second, third and fourth arrays of secondary conductors arranged along the right side, adjacent the right edge along the top surface, adjacent the left edge along the top surface, and along the left side, respectively, of the U-shaped guideway and a first and second electromagnetic field coil disposed on the vehicle and in juxtaposition with the first and second arrays of secondary conductors, and third and fourth arrays of secondary conductors, respectively, as the vehicle moves along the U-shaped guideway.

23. An apparatus as described in claim 16 wherein the guideway means includes a T-shaped guideway having a top surface with a right and left edge and a bottom surface with a right and left edge; and the actively controlling means includes a first, second, third and fourth array of secondary conductive arranged along and adjacent the right edge and left edge of the top surface, and the right edge and left edge of the bottom surface, respectively; and a first, second, third and fourth primary electromagnetic field coil disposed on the vehicle and opposing the first, second, third and fourth arrays of secondary conductors, respectively, as the vehicle moves along the T-shaped guideway.

24. The system of claim 1 wherein said null-flux electrical loop control means linking secondary conductors on each side of the guideway for the purpose of providing an automatic means for magnetic field regulation in magnetic circuits producing vehicle levitation force, said magnetic circuits defined by the primary field coils and corresponding secondary conductors; and an electronic switching means for controlling the amount of current induced in each side of the null-flux electrical loop control means for the purpose of creating independent levitation forces on each side of the guideway to counteract centrifugal forces and to compensate for roll motions of the vehicle.

25. The apparatus according to claim 16 further including a vehicle having a longitudinal array of electrodynamic guidance conductors and said means for actively controlling including electronic high powered switching in a null-flux loop to regulate current in said electrodynamic guidance conductors.

* * * * *